United States Patent
Ota et al.

(10) Patent No.: US 8,327,517 B2
(45) Date of Patent: Dec. 11, 2012

(54) VEHICLE BRAKE HYDRAULIC PRESSURE CONTROL UNIT AND METHOD FOR PRODUCING THE SAME

(75) Inventors: Kazuhiro Ota, Nagano (JP); Naoki Yamada, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 1063 days.

(21) Appl. No.: 11/870,879

(22) Filed: Oct. 11, 2007

(65) Prior Publication Data

US 2008/0093915 A1    Apr. 24, 2008

(30) Foreign Application Priority Data

Oct. 13, 2006    (JP) .............................. P. 2006-280421

(51) Int. Cl.
*B21D 51/16*    (2006.01)
*B21D 39/00*    (2006.01)

(52) U.S. Cl. ................. 29/505; 29/890.09; 29/522.1
(58) Field of Classification Search ... 301/1; 29/890.09, 29/505, 506, 507, 508, 509, 515, 520, 521, 29/52.1
See application file for complete search history.

(56) References Cited

U.S. PATENT DOCUMENTS

| | | | | |
|---|---|---|---|---|
| 4,418,711 A | * | 12/1983 | Stoll et al. | 137/269 |
| 4,922,966 A | * | 5/1990 | Kaes et al. | 137/627.5 |
| 5,984,263 A | * | 11/1999 | Hosoya | 251/129.15 |
| 5,993,179 A | * | 11/1999 | Baur et al. | 417/554 |
| 6,007,162 A | * | 12/1999 | Hinz et al. | 303/119.3 |
| 6,318,703 B1 | * | 11/2001 | Goossens et al. | 251/129.15 |
| 6,463,646 B2 | * | 10/2002 | Yamazaki et al. | 29/407.01 |
| 8,127,788 B2 | * | 3/2012 | Yamashita et al. | 137/315.03 |
| 2002/0011206 A1 | * | 1/2002 | Yamazaki et al. | 118/665 |
| 2005/0073194 A1 | | 4/2005 | Katayama | |

FOREIGN PATENT DOCUMENTS

CN    1446157    10/2003

(Continued)

OTHER PUBLICATIONS

European Search Report dated Sep. 3, 2009 for related European Application No. EP 07 02 0066.

(Continued)

*Primary Examiner* — David Bryant
*Assistant Examiner* — Jacob Cigna
(74) *Attorney, Agent, or Firm* — Andrew M. Calderon; Roberts Mlotkowski Safran & Cole, P.C.

(57) ABSTRACT

A vehicle brake hydraulic pressure control unit includes a base body 1 incorporating therein a brake fluid flow path 1a and an electromagnetic valve 2 which is an assembled part assembled into a mounting hole portion 10A which is formed in the base body 1 in such a manner as to communicate with the flow path 1a. A hole wall of the mounting hole portion 10A has a plastically deformed portion 18 formed by pressing the hole wall in a downward direction of the mounting hole portion 10A. A locking groove 214 for the plastically deformed portion 18 to enter is formed on an outer circumferential surface of the electromagnetic valve 2. An outside diameter of the electromagnetic valve 2 at an upper side of the locking groove 214 is made smaller than an outside diameter of the electromagnetic valve 2 at a lower side of the locking groove 214.

19 Claims, 16 Drawing Sheets

FOREIGN PATENT DOCUMENTS

| | | |
|---|---|---|
| JP | 6-64154 | 3/1994 |
| JP | 10-338117 | 12/1998 |
| JP | 11240439 A * | 9/1999 |
| JP | 11-351151 | 12/1999 |
| JP | 11351151 A * | 12/1999 |
| JP | 2001-280533 | 10/2001 |
| JP | 2001280533 A * | 10/2001 |
| JP | 2003-10975 | 1/2003 |
| JP | 2004-284590 | 10/2004 |
| JP | 2005-133934 | 5/2005 |

OTHER PUBLICATIONS

English Translation of Chinese Office Action for corresponding Chinese Application No. 2007-101524663.

Chinese Office Action for corresponding Chinese Application No. 2007-101524663.

Japanese Office Action for corresponding Japanese Application No. 2006-280421 (English translation).

* cited by examiner

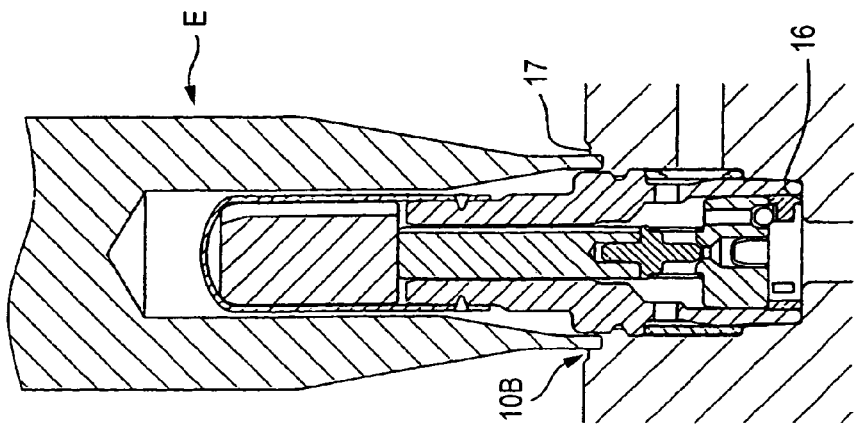
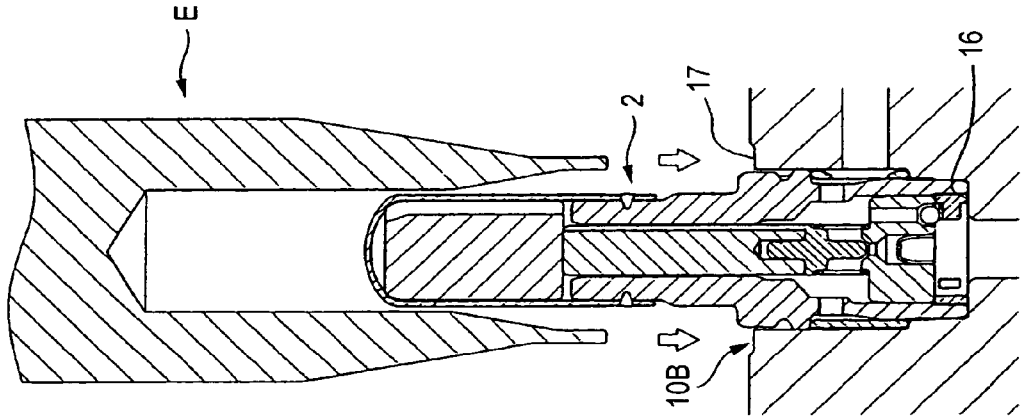
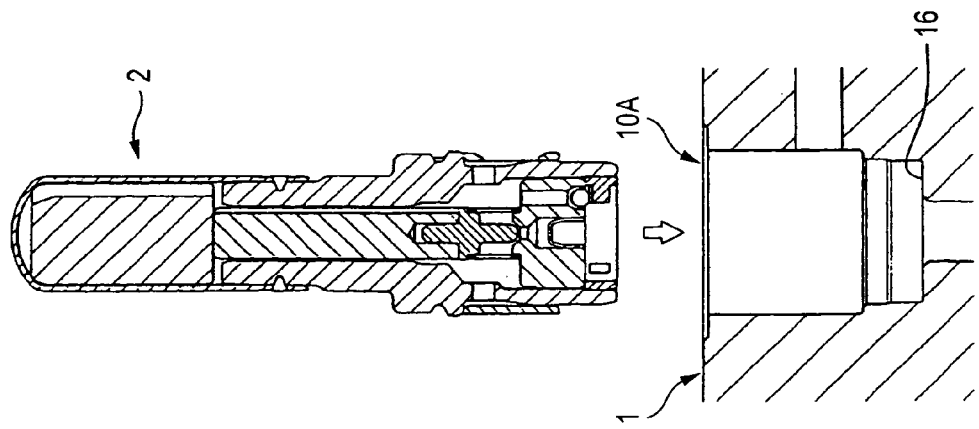

FIG. 9A
FIG. 9B
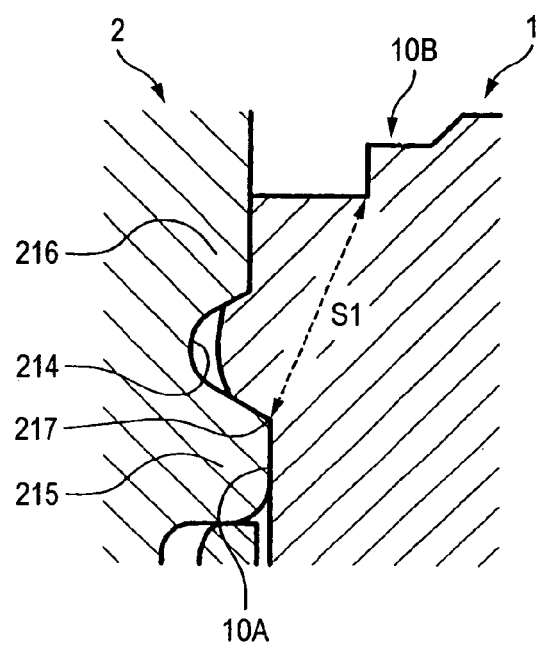
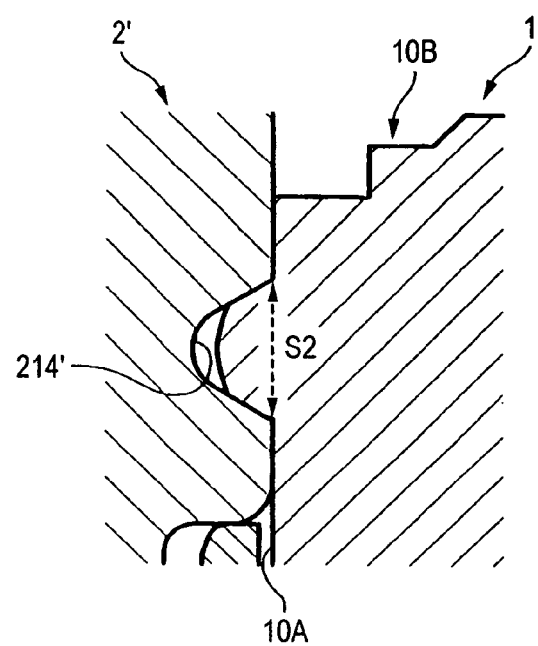

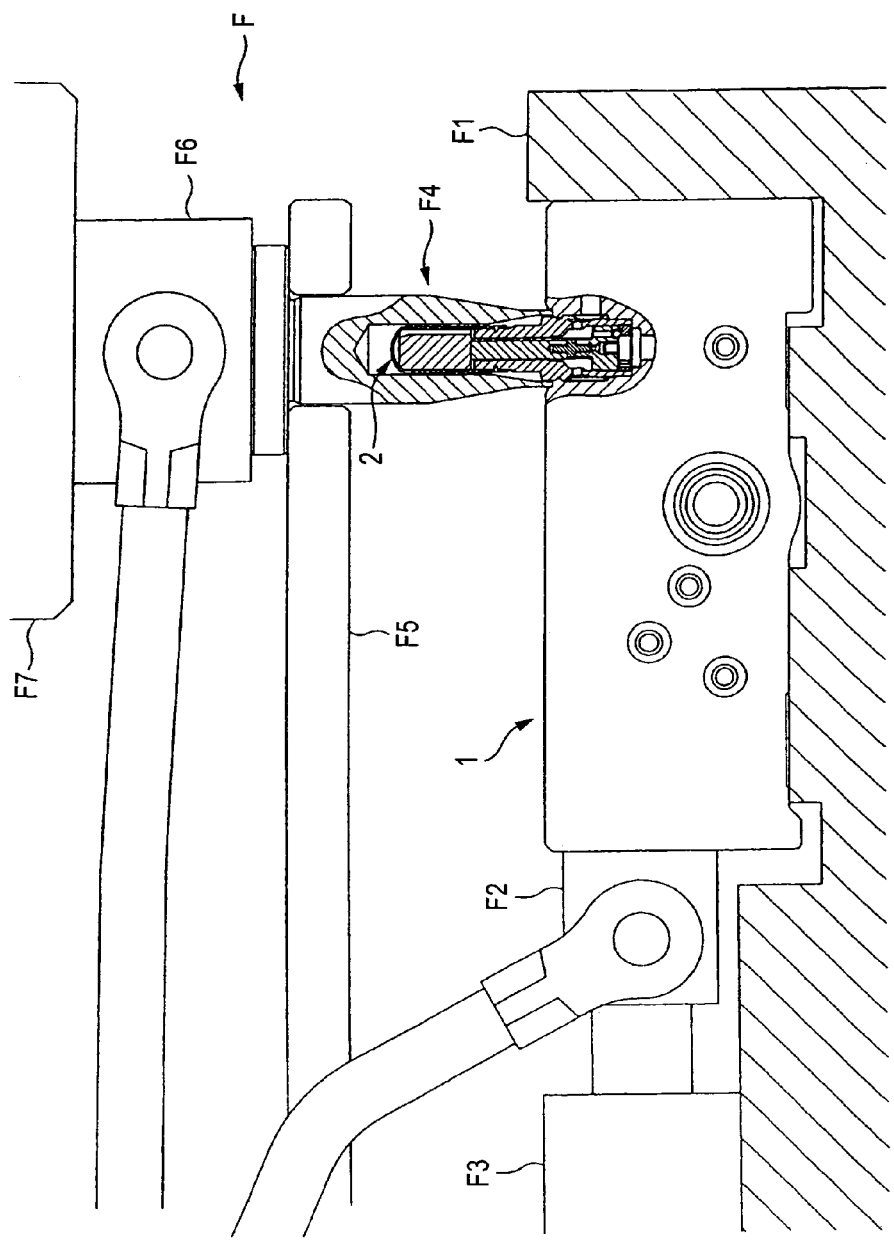

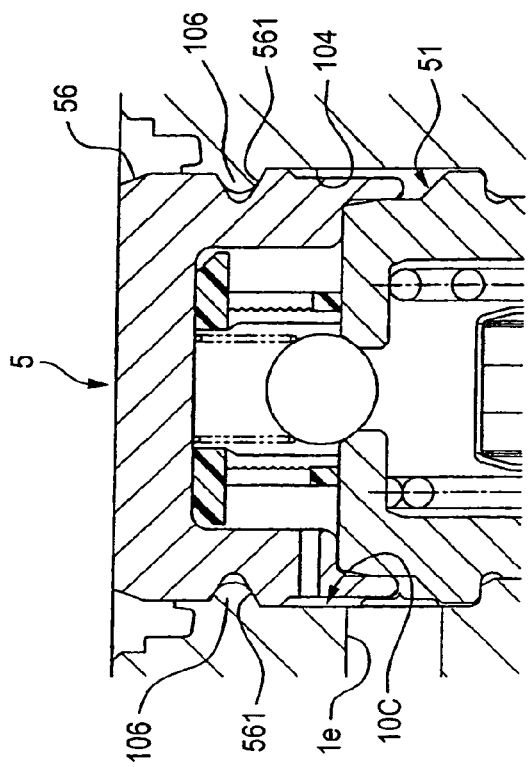
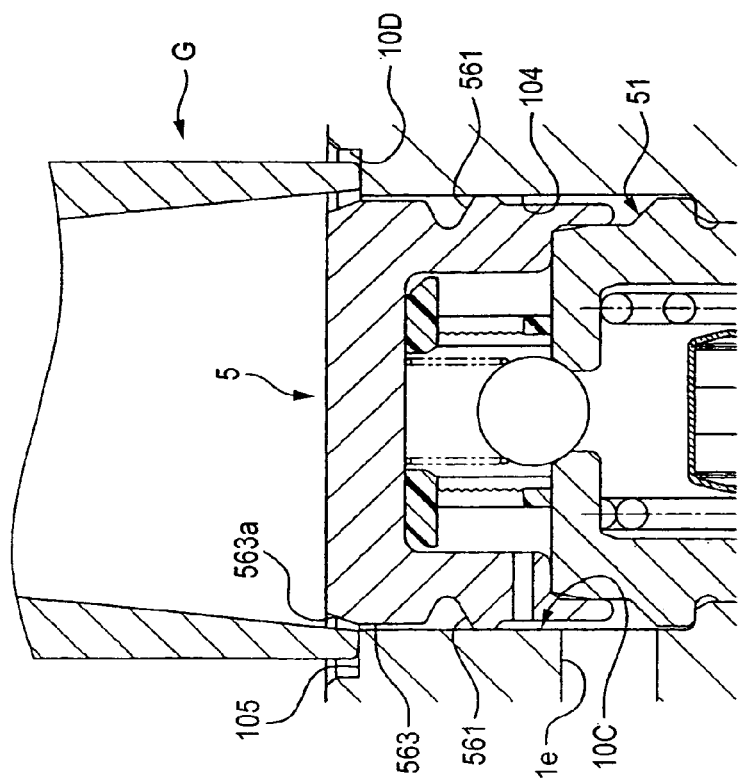

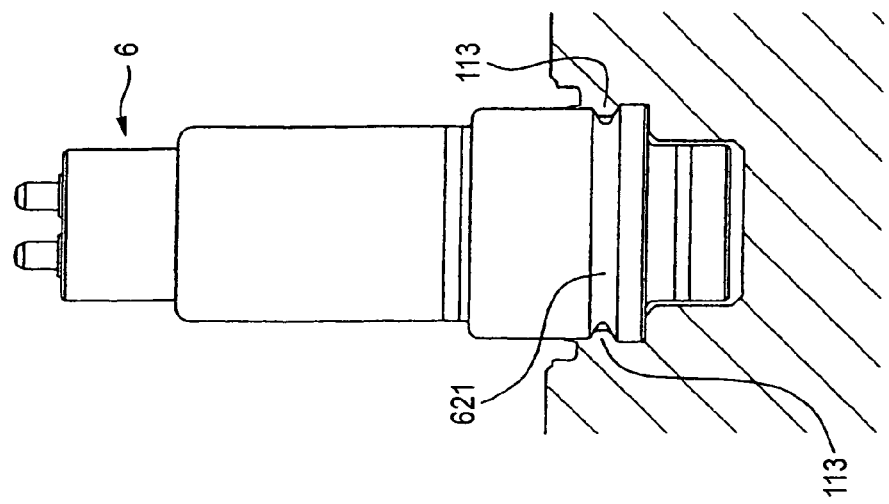
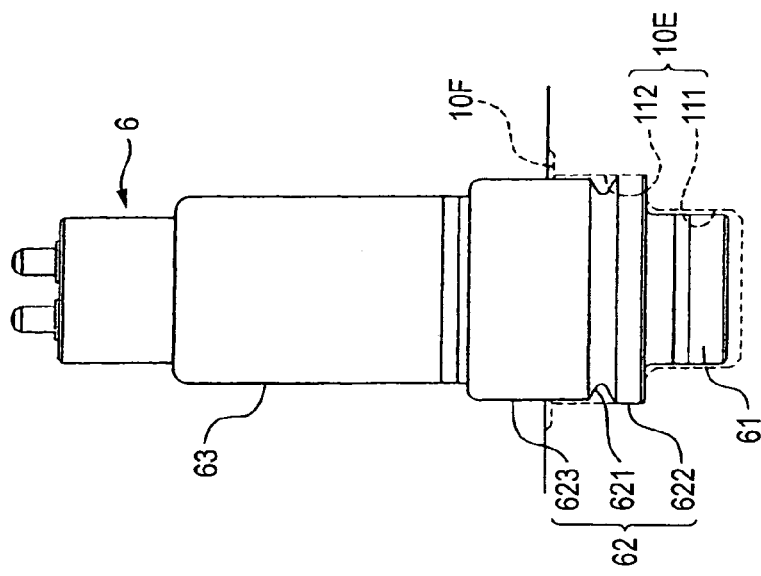
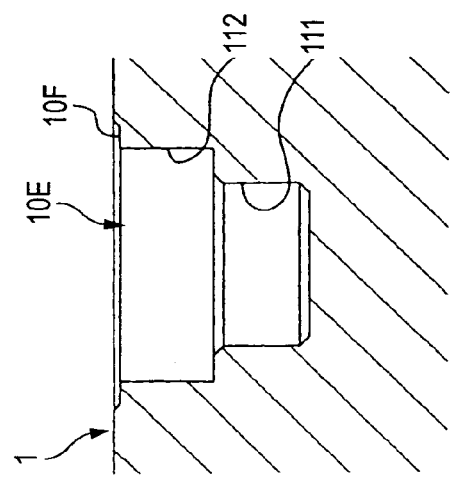

VEHICLE BRAKE HYDRAULIC PRESSURE CONTROL UNIT AND METHOD FOR PRODUCING THE SAME

BACKGROUND OF THE INVENTION

1. Field of the Invention

The present invention relates to a vehicle brake hydraulic pressure control unit which is characterized in a mounting construction of assembled parts such as an electromagnetic valve, a pump, a pressure sensor and the like and, a method for producing the same control unit.

2. Description of Related Art

There are known vehicle brake fluid control units which include a base body which incorporates therein a brake fluid flow path and assembled parts such as an electromagnetic valve, a pump, a pressure sensor and the like as vehicle brake hydraulic pressure control units for controlling the magnitude of a brake hydraulic pressure applied to wheel brakes (for example, Japanese Patent Unexamined Publications Nos. JP-A-2001-280533 and JP-A-2005-133934).

Incidentally, in JP-A-2001-280533 and JP-A-2005-133934, an electromagnetic valve, which is one of the assembled parts, is assembled into a bottomed mounting hole portion which is provided in the base body in such a manner as to communicate with the flow path in the interior of the base body. In addition, in JP-A-2001-280533 and JP-A-2005-133934, a lower end portion of the electromagnetic valve is inserted into a lower portion of the mounting hole portion for subsequent clamping process, and a plastically deformed portion is thereafter formed on a hole wall of the mounting hole portion by pressing the surface of the base body around the circumference of an opening in the mounting hole portion. Then, the plastically deformed portion so formed is caused to enter a locking groove formed on an outer circumferential surface of the electromagnetic valve to thereby prevent the dislocation of the electromagnetic valve from the mounting hole portion.

In the vehicle brake hydraulic pressure control unit of JP-A-2001-280533, the outside diameter of the electromagnetic valve is made identical at an upper side of the locking groove (an opening side of the mounting hole portion) and a lower side thereof (a bottom surface side of the mounting hole portion). Therefore, when a force is applied in a direction in which the electromagnetic valve is pushed out from the mounting hole portion by virtue of brake hydraulic pressure, there is caused a fear that a shear fracture plane is generated in a proximal end portion of the plastically deformed portion which protrudes into the interior of the locking groove. Namely, in the vehicle brake hydraulic pressure control unit of JP-A-2001-280533, since the assembling strength of the electromagnetic valve (the resisting force which resists the extruding force by virtue of brake hydraulic pressure) is dependent on the groove width of the locking groove, when the groove width of the locking groove is decreased, the assembling strength of the solenoid is also decreased. Namely, when attempting to realize a reduction in size of the electromagnetic valve by reducing the size of the locking groove as disclosed in JP-A-2001-280533, the assembling strength of the electromagnetic valve has to be sacrificed. In addition, in the vehicle brake hydraulic pressure control unit of JP-A-2005-133934, as well, since the outside diameter of the electromagnetic valve is made identical at an upper side and a lower side of the locking groove, when attempting to realize a reduction in size of the electromagnetic valve by reducing the size of the locking groove, the assembling strength of the electromagnetic valve has to be sacrificed.

In addition, when the outside diameter of the electromagnetic valve is made identical at the upper side and the lower side of the locking groove, since the plastically deformed hole wall is brought into close contact with the outer circumferential surface of the electromagnetic valve which lies further upwards than the locking groove immediately after the hole wall of the mounting hole portion starts the plastic deformation, the clamping load has to be increased.

Note that the aforesaid problem is not limited to the case where the assembled part is the electromagnetic valve but commonly applies to a case where the assembled part is a pump, a reservoir, a pressure sensor or the like.

SUMMARY OF THE INVENTION

The invention has been made in view of the situations described above. An object thereof is to provide a vehicle brake hydraulic pressure control unit which can realize a reduction in size of an assembled part while securing the assembling strength of the assembled part and can clamp and fix the assembled part in place in a mounting hole portion in a base body with a small clamping load. Further, another object of the invention is to provide a method for producing a vehicle brake hydraulic pressure control unit which can clamp and fix a an assembled part in place in a mounting hole portion in a base body with a small clamping load.

With a view to attaining the object, according to an aspect of the invention, there is provided a vehicle brake hydraulic pressure control unit including:

a base body including:
  a brake fluid flow path; and
  a mounting hole portion which communicates with the flow path; and
an assembled part assembled into the mounting hole portion of the base body, wherein
  a hole wall of the mounting hole portion includes a plastically deformed portion which is formed by pressing the hole wall in a downward direction,
  a locking groove to which the plastically deformed portion enters is formed on an outer circumferential surface of the assembled part, and
  an outside diameter of the assembled part at an upper side of the locking groove is made smaller than an outside diameter of the assembled part at a lower side of the locking groove.

When used in the invention, the assembled part means a general designation for parts which are assembled to the base body to embody a hydraulic circuit and it contains at least an electromagnetic valve, a pump, a reservoir, a pressure sensor and the like. In addition, when "upper" and "lower" are used together with the assembled part in this specification, for example, the "lower side" means a bottom surface side of the mounting hole portion based on the state in which the assembled part is assembled in place in the mounting hole portion.

In the vehicle brake hydraulic pressure control unit according to the invention, the outside diameter of the assembled part at the upper side of the locking groove is made smaller than the outside diameter thereof at the lower side of the locking groove. Therefore, the hole diameter of the mounting hole portion after the plastic deformation (after clamping) also becomes smaller at the upper side than at the lower side of the locking groove. Consequently, when the force is applied to the assembled part in the direction in which the assembled part is pushed out from the mounting hole portion, a shear fracture plane is formed in such a manner as to rise obliquely upwards from an outer circumferential edge at the lower side of the locking groove. Namely, although the shear fracture distance becomes equal to the groove width of the locking groove when the outside diameter of the assembled part is made identical at the upper side and lower side of the locking groove, according to the vehicle brake hydraulic pressure control unit of the invention, since the shear fracture distance becomes equal to or longer than the groove width of the locking groove, even though the groove width is decreased, it becomes possible to secure an assembling strength which is equal to that realized when the outside diameter of the assembled part is made equal at the upper and lower sides of the locking groove. In addition, in the event that the groove width of the locking groove in the vehicle brake hydraulic pressure control unit of the invention is made equal to the groove width of the locking groove in the vehicle brake hydraulic pressure control unit in which the outside diameter of the assembled part is made identical at the upper and lower sides of the locking groove, the assembling strength of the assembled part is eventually increased.

In addition, in the vehicle brake hydraulic pressure control unit according to the invention, the outside diameter of the assembled part at the upper side of the locking groove is made smaller than the outside diameter of the assembled part at the lower side of the locking groove and a gap that is defined at the upper side of the locking groove (a gap defined between the hole wall of the mounting hole portion and the electromagnetic valve) is made larger than a corresponding gap that is defined in the vehicle brake hydraulic pressure control unit in which the outside diameter of the assembled part at the upper side of the locking groove is made equal to the outside diameter of the assembled part at the lower side of the locking groove. Therefore, the plastically deformed portion can be formed with a smaller clamping load than that of the conventional example. Namely, according to the invention, since the clamping load can be decreased, it becomes possible to reduce the size of production equipment.

According to another aspect of the invention, there is provided a method for producing a vehicle brake hydraulic pressure control unit including:

drilling a bottomed mounting hole portion in a base body including a brake fluid flow path so as to communicate with the flow path;

inserting an assembled part which includes a locking groove on an outer circumferential surface thereof into the mounting hole portion so that a lower end surface of the assembled part is brought into abutment with a bottom surface of the mounting hole portion; and forming a plastically deformed portion on a hole wall of the mounting hole portion by pressing the hole wall of the mounting hole portion towards the bottom surface of the mounting hole portion so as to bring the plastically deformed portion into engagement with the locking groove to thereby fix the assembled part in place, wherein an outside diameter at an upper side of the locking groove is made smaller than an outside diameter at a lower side of the locking groove.

According to the method for producing a vehicle brake hydraulic pressure control unit of the invention, the plastically deformed portion can be formed with a smaller clamping load than that of the conventional technique. Namely, according to the invention, since the clamping load can be decreased, it becomes possible to reduce the size of production equipment. In addition, since the inserting position of the assembled part is made to be restricted by causing the lower end surface of the assembled part to come into abutment with the bottom surface of the mounting hole portion, the assembled part is made difficult to be inclined when the assembled part is fixed by clamping the hole wall of the mounting hole portion.

In the drilling step, the mounting hole portion may be formed by a lower stepped portion of a stepped drilling tool, while forming a recessed portion by an upper stepped portion of the drilling tool in such as manner a to surround an opening of the mounting hole portion, and in the fixing step, the plastically deformed portion may be formed by pressing a bottom surface of the recessed portion towards the bottom surface of the mounting hole portion.

By adopting this configuration, deviation in magnitude of the clamping load and in amount in which the plastically deformed portion is filled into the locking groove is made difficult to be generated when the assembled part is clamped and fixed in place in the mounting hole portion in the base body. Namely, in the invention, while the assembled part is clamped and fixed in place by pressing the bottom surface of the recessed portion towards the bottom surface of the mounting hole portion, since the mounting hole portion and the recessed portion are formed integrally with the same tool and the lower end surface of the assembled part is brought into abutment with the recessed portion on the mounting plane, deviation in distance from the bottom surface of the recessed portion to the locking groove on the assembled part is made difficult to be generated. As a result of this, deviation in amount in which the plastically deformed portion is filled into the locking groove is also made difficult to be generated.

In the fixing step, the plastically deformed portion may be formed by pressing the hole wall of the mounting hole portion in the downward direction while heating. Since the hole wall is made soft by heating the hole wall of the mounting hole portion, when pressing the hole wall of the mounting hole portion towards the bottom surface, the load (the clamping load) required to plastically deform the hole wall can be decreased.

In addition, in the fixing step, the hole wall of the mounting hole may be heated by electrically connecting one electrode with the base body, while electrically connecting the other electrode with a clamping jig for pressing the hole wall of the mounting hole portion for energization of the electrodes when the hole wall is pressed towards the bottom surface of the mounting hole portion by means of the clamping jig. By adopting this configuration, since only the vicinity of the clamping jig can be heated locally, the modification in quality of the base body due to heat so applied can be suppressed to a required minimum level.

According to the vehicle brake hydraulic pressure control unit of the invention, the reduction in size of the assembled part can be realized while securing the assembling strength of the assembled part. Furthermore, the assembled part can be fixed in place in the mounting hole portion in the base body with a small clamping load.

In addition, according to the method for producing a vehicle brake hydraulic pressure control unit of the invention, the assembled part can be fixed in place in the mounting hole portion in the base body with a small clamping load.

BRIEF DESCRIPTION OF THE DRAWINGS

FIGS. 6A to 6C are sectional views which explain an inserting step and a fixing step of the method for producing the vehicle brake hydraulic pressure control unit according to the first embodiment of the invention;

FIG. 9A is a sectional view which explains the function of the vehicle brake hydraulic pressure control unit according to the first embodiment of the invention, and FIG. 9B is a sectional view which shows a vehicle brake hydraulic pressure control unit according to a comparison example;

FIG. 11 is an exemplary diagram showing another method for producing the vehicle brake hydraulic pressure control unit according to the first embodiment of the invention;

FIGS. 15A and 15B are sectional views which explain a method for producing the vehicle brake hydraulic pressure control unit according to the second embodiment of the invention;

FIG. 16A is sectional view showing a mounting hole portion of a vehicle brake hydraulic pressure control unit according to a third embodiment of the invention;

FIG. 16B is a side view which explains the configuration of a pressure sensor which is an assembled part; and FIG. 16C is a side view showing a state in which the pressure sensor is assembled in place in the mounting hole portion.

DETAILED DESCRIPTION OF THE PREFERRED EMBODIMENTS

Figure 1:
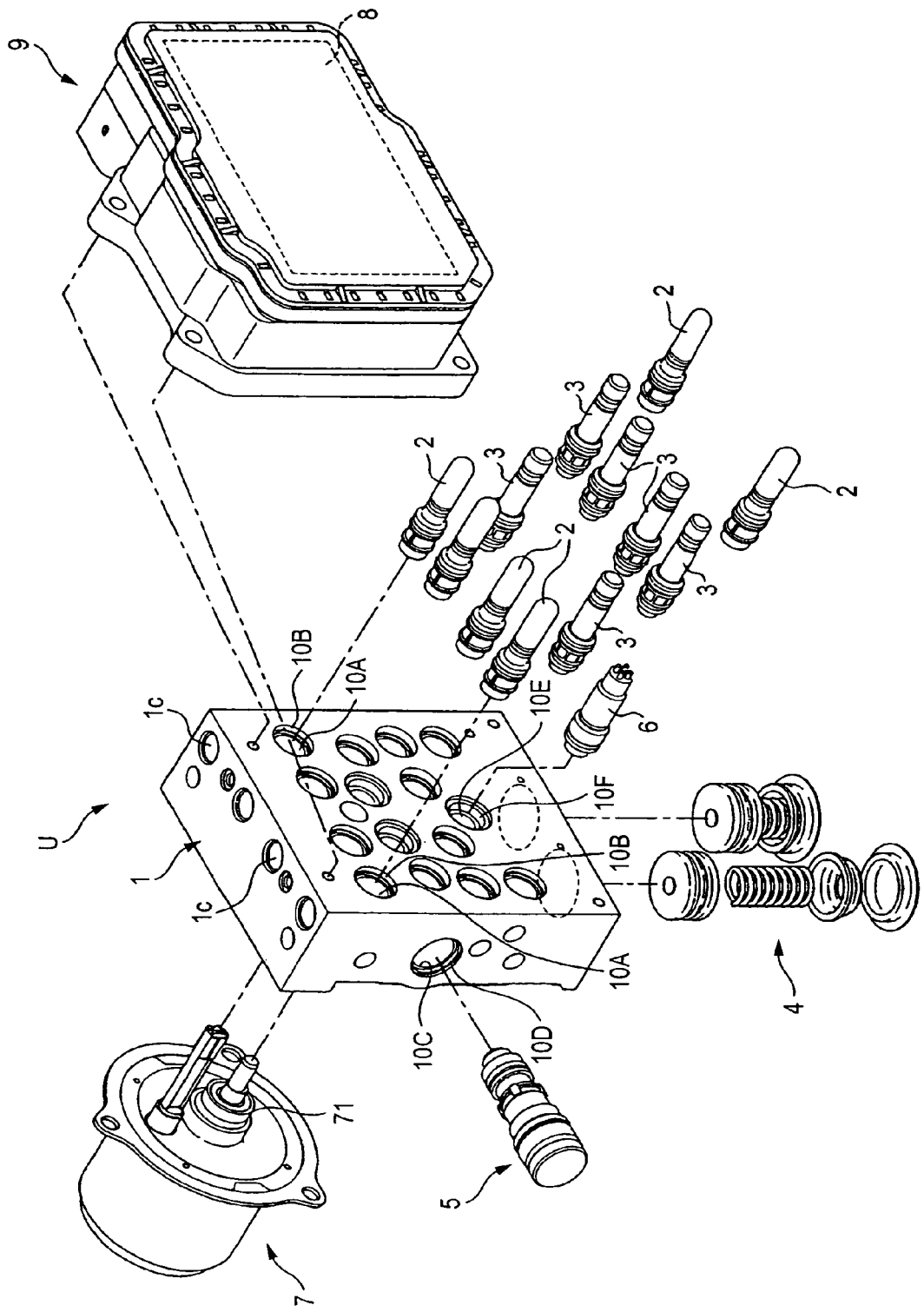
FIG. 1 is an exploded perspective view showing a vehicle brake hydraulic pressure control unit according to a first embodiment of the invention.

Hereinafter, examples of embodiments of the invention will be described in detail by reference to the accompanying drawings. Note that like reference numerals will be given to like elements, so as to omit the repetition of similar descriptions.

First Embodiment

As shown in FIG. 1, a vehicle brake hydraulic pressure control unit U according to a first embodiment of the invention is configured to include a base body 1 which incorporates therein a brake fluid flow path, a normally open electromagnetic valve 2 which is an assembled part to be assembled in place in a mounting hole portion 10A formed in the base body 1 and the like. Note that while the vehicle brake hydraulic pressure control unit U includes a motor 7, an electronic control unit 8, a housing 9 and the like in addition to other assembled parts such as a normally closed electromagnetic valve 3, a reservoir 4, a pump 5 and a pressure sensor 6, since they are similar to those mounted in a conventional one, the detailed description thereof will be omitted here.

Figure 2:
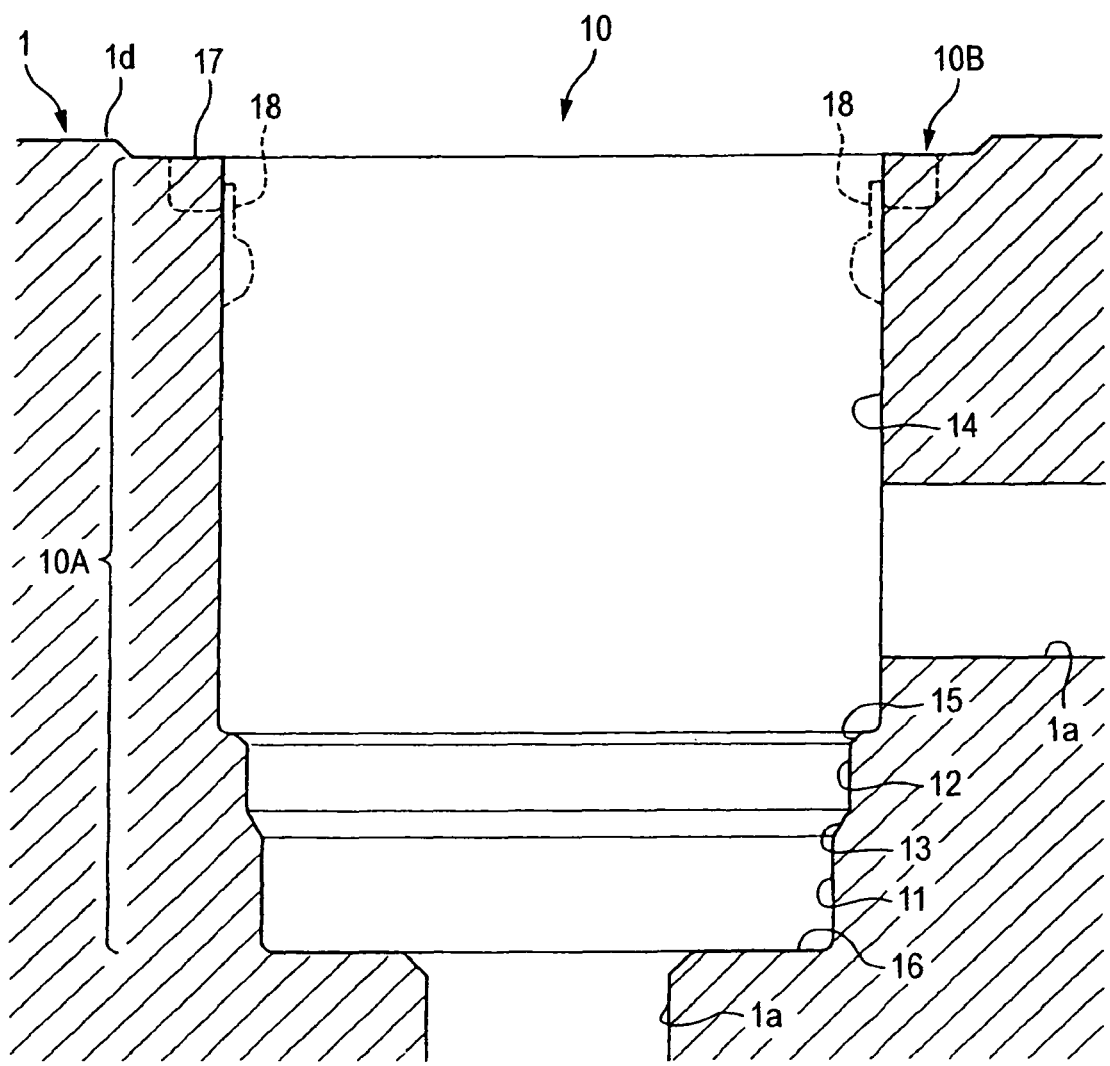
FIG. 2 is a sectional view showing a mounting hole portion.

The base body 1 is a member which is substantially a rectangular parallelepiped and which is made of aluminum alloy and incorporates therein a brake fluid flow path 1a (refer to FIG. 2). The mounting hole portion 10 in which the normally open electromagnetic valve 2 is mounted and a recessed portion 10B which is formed in such a manner as to surround the mounting hole portion 10A are formed in the base body 1. Furthermore, formed in the base body 1 are holes in which the normally closed electromagnetic valve 3, the reservoir 4, the pump 5, the pressure switch 6 and the like are mounted, an inlet port 1b to which a piping, not shown, which communicates with a master cylinder (not shown) is connected, outlet ports 1c to which pipings, not shown, which reach wheel brakes are connected, and the like. The respective holes are made to communicate with each other directly or via flow paths, not shown, which are formed in the interior of the base body 1.

The mounting hole portion 10A is, as shown in FIG. 2, a bottomed hole which is formed in such a manner as to communicate with flow paths 1a, 1a formed in the interior of the base body 1. In addition, the mounting hole portion 10A includes a cylindrical abutment portion 11 which is formed in a lower portion (a deepest portion), a cylindrical introducing portion 12 which is formed in a location which lies shallower than the abutment portion 11, a truncated cone-shaped tapered portion 13 which connects the abutment portion 11 with the introducing portion 12, a cylindrical holding portion 14 which is formed in a location which lies shallower than the introducing portion 12 and a truncated cone-shaped connecting portion 15 which connects the introducing portion 12 with the holding portion 14.

A diameter of the mounting hole portion 10A at the introducing portion 12 is made larger than a diameter at the abutment portion 11, and a diameter of the mounting hole portion 10A at the holding portion 14 is made larger than the diameter at the introducing portion 12. Namely, the mounting hole portion 10A is formed into a stepped cylindrical shape which sequentially increases in diameter as it extends from a bottom surface 16 towards an opening thereof.

One of the flow paths 1a, 1a is made to open to the bottom surface 16, while the other is made to open to the holding portion 14. Note that since the flow path 1a is made to open to the bottom surface 16, the bottom surface 16 exhibits a circular belt-like shape.

The recessed portion 10B exhibits the circular belt-like shape when viewed from the top and is formed concentrically with the mounting hole portion 10A. A bottom surface 17 of the recessed portion 10B is formed so that the bottom surface of the mounting hole portion 10A is as a standard. Namely, the recessed portion 10B is not formed by specifying a depth from a surface 1d of the base body 1 but is formed by specifying a depth from the bottom surface 17 of the recessed portion 10B to the bottom surface 16 of the mounting hole portion 10A. In addition, the bottom surface 16 of the mounting hole portion 10A and the bottom surface 17 of the recessed portion 10B are made parallel to each other.

Figure 3:
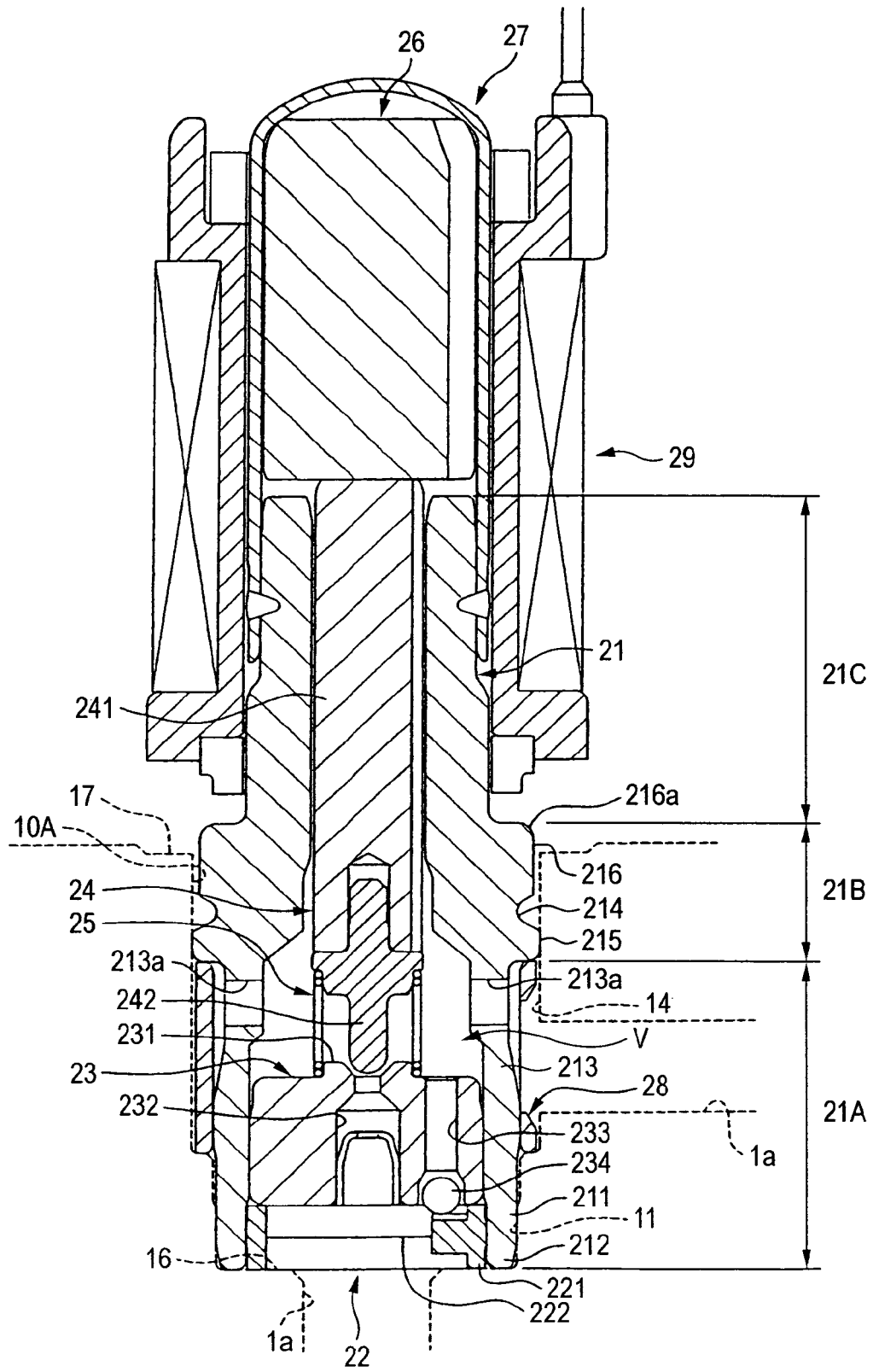
FIG. 3 is a sectional view which explains the configuration of an electromagnetic valve which is an assembled part.

As shown in FIG. 3, the normally open electromagnetic valve 2 is configured to include a cylindrical valve housing 21 which makes up a stationary core, a first dust collecting filter 22 mounted in an inner space of the valve housing 21 in a lower end portion thereof, a valve seat constituting material 23 mounted on an upper side of the dust collecting filter 22 in the inner space of the valve housing 21, a valve element 24 disposed above the valve seat constituting material 23 in the inner space of the valve housing 21, a return spring 25 interposed between the valve seat constituting material 23 and the valve element 24, a movable core 26 disposed on an upper side of the valve element 24, a cover 27 which covers the movable core 26 and a second dust collecting filter 28 mounted in such a manner as to surround an outer circumferential surface of the valve housing 21. In addition, although the electromagnetic valve 2 protrudes from the mounting hole portion 10A, an electromagnetic coil 29 for driving the electromagnetic valve 2 is disposed around the periphery of a protruding part of the electromagnetic valve 2.

The valve housing 21 is made of a magnetic material such as iron or iron alloy and includes an insertion portion 21A which is inserted into the mounting hole portion 10A, a lid portion 21B which closes the opening in the mounting hole portion 10A and a protruding portion 21C which is provided on the lid portion 21B in such a manner as to protrude therefrom. In addition, the inner space of the valve housing 21 is formed into a stepped cylindrical shape which sequentially increases its diameter as it extends in a downward direction.

Figure 4:
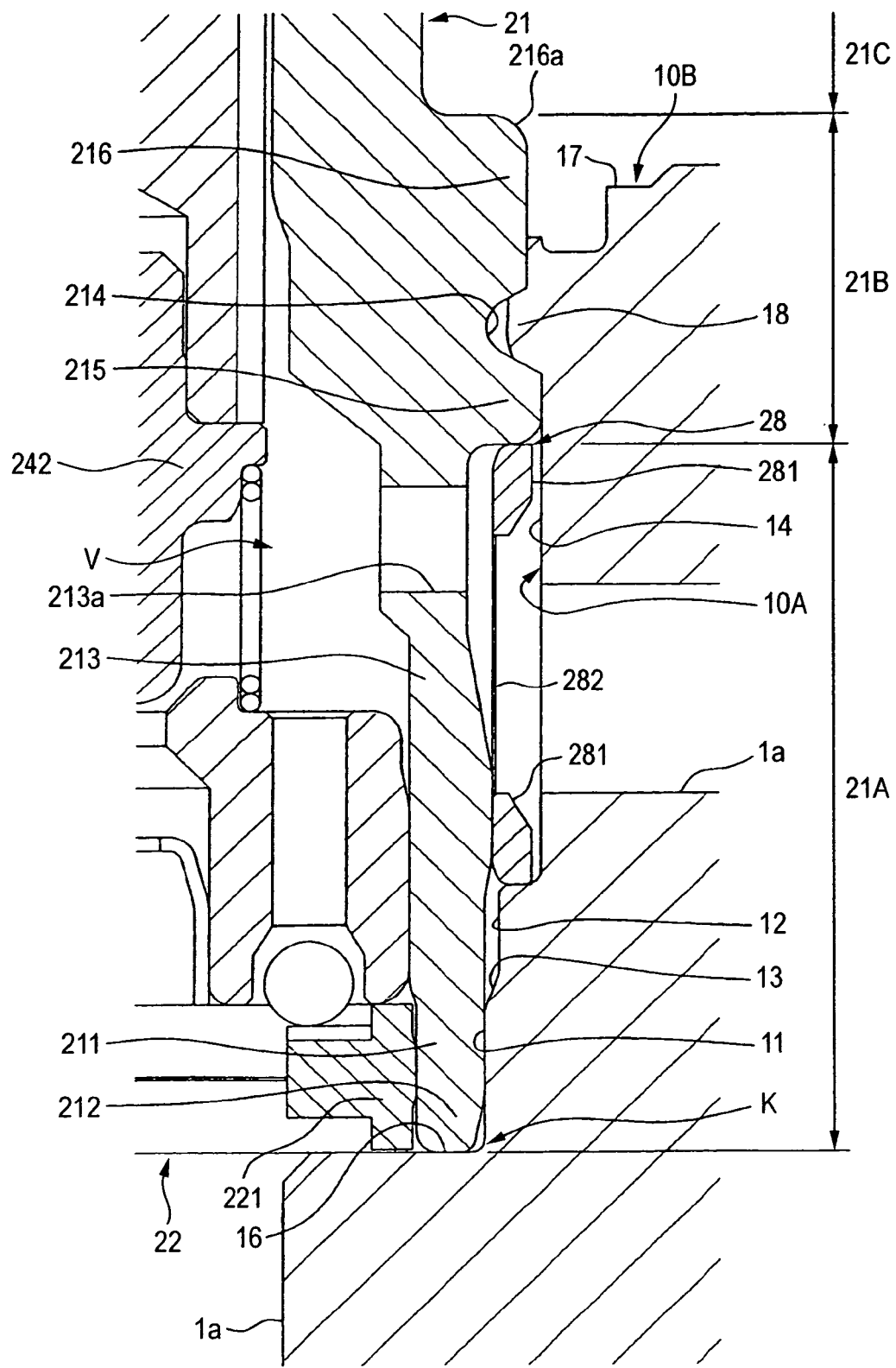
FIG. 4 is an enlarged sectional view which explains the configuration of the electromagnetic valve which is the assembled part.

As shown in FIG. 4, a lower end portion of the insertion portion 21A (that is, a lower end portion of the electromagnetic valve 2) includes a press-fit portion 211 which is press fitted in the abutment portion 11 of the mounting hole portion 10A and a small diameter portion 212 whose diameter is made smaller than the diameter of the press-fit portion 211.

The outside diameter of the press-fit portion 211 is made equal to or slightly larger than the diameter of the mounting hole portion 10A at the abutment portion 11 or the hole diameter of the abutment portion 11, and when the press-fit portion 211 is press fitted in the abutment portion of the mounting hole portion 10A, an outer circumferential surface of the press-fit portion 211 is joined to an inner circumferential surface of the abutment portion 11, whereby the leakage of brake fluid by way of the inner circumferential surface of the abutment portion 11 is prevented.

The small diameter portion 212 is formed on a lower side of the press-fit portion 211. A lower end surface of the small diameter portion 212 is brought into abutment with the bottom surface 16 of the mounting hole portion 10A over the entirety (along the full circumference) thereof. In addition, a location of the insertion portion 21A which lies further upwards than the press-fit portion 211 (hereinafter, referred to as a "valve compartment constituting portion 213") face inner circumferential surfaces of the introducing portion 12 and the holding portion 14 of the mounting hole portion 10A with a gap defined therebetween. A valve compartment V and a through hole 213a for establishing a communication with the flow path 1a are formed in the valve compartment constituting portion 213.

In this embodiment, an annular accommodation space K is defined by an outer circumferential surface of the small diameter portion 212, and the inner circumferential surface of the abutment portion 11 and the bottom surface 16 of the mounting hole portion 10A. The accommodation space K is a space which can accommodate chippings produced when the press-fit portion 211 (that is, the lower end portion of the electromagnetic valve 2) is press fitted in the mounting hole portion 10A, and the accommodation space K constitutes a tightly closed space due to the outer circumferential surface of the press-fit portion 211 being joined to the inner circumferential surface of the abutment portion 11 of the mounting hole portion 10A and the lower end surface of the small diameter portion 212 (that is, the lower end surface of the solenoid vale 2) being brought into abutment with the bottom surface 16 of the mounting hole portion 10A.

As shown in FIG. 3, a locking groove 214 is provided on an outer circumferential surface of the lid portion 21B by setting back a relevant location into the outer circumferential surface along a circumferential direction thereof so that a plastically deformed portion 18 (refer to FIG. 2) that is formed when a hole wall of the mounting hole portion 10A is clamped enters it. In this lid portion 21B, an outside diameter at an upper side of the locking groove 214 is made smaller than an outside diameter at a lower side thereof. In this embodiment, a difference in outside diameter of 0.4 mm is provided between the upper side and the lower side of the locking groove 214. Note that in the following description, an annular part of the lid portion 21B which lies further downwards than the locking groove 214 is referred to as a "lower lid 215" and an annular part thereof which lies further upwards than the locking groove 214 is referred to as an "upper lid 216."

The lower lid 215 lies further upwards than the flow path 1a which is made to open to the holding portion 14 when the electromagnetic valve 2 is assembled in place in the mounting hole portion 10A. The outside diameter of the lower lid 215 is made larger than the outside diameters of the insertion portion 21A and the protruding portion 21C but is made slightly smaller than the diameter of the mounting hole portion 10A at the holding portion 14 or the hole diameter of the holding portion 14. An outer circumferential surface of the lower lid 215 faces an inner circumferential surface of the holding portion 14 of the mounting hole portion 10A with a slight gap defined therebetween. Note that a lower surface of the lower lid 215 abuts in no case with the hole wall of the mounting hole portion 10A.

The upper lid 216 protrudes from the bottom surface 17 of the recessed portion 10B when the electromagnetic valve 2 is assembled in place in the mounting hole portion 10A. In addition, an upper circumferential edge portion 216a of the upper lid 216 is chamfered. The outside diameter of the upper lid 216 is made smaller than the hole diameter of the holding portion 14 of the mounting hole portion 10A. Namely, an outer circumferential surface of the upper lid 216 faces the inner circumferential surface of the holding portion 14 of the mounting hole portion 10A with a gap defined therebetween.

The protruding portion 21C is a stepped cylindrical shape and an outside diameter of an upper half portion is made smaller than an outside diameter of a lower half portion thereof. Note that the protruding portion 21C is disposed inside the electromagnetic coil 29.

The first dust collecting filter 22 includes a cylindrical frame element 221 which is fitted in the valve compartment constituting portion 213 of the valve housing 21 and a net-like element 222 which is held on the frame element 221.

The valve seat constituting material 23 is a cylindrical member which is fitted in the valve compartment constituting portion 213 of the valve housing 21 and an outer circumferential surface thereof is joined to an inner circumferential surface of the valve compartment constituting portion 213. A valve seat 231 on which the valve element 24 is seated is provided in the center of an upper surface of the valve seat constituting material 23 in such a manner as to protrude therefrom while surrounding a hollow portion 232. In addition, a through hole 233 is formed parallel to the hollow portion 232 in a side portion of the valve seat constituting portion 23, and a spherical element 234 which constitutes a one-way valve is disposed at a lower end portion of the through hole 233. The spherical element 234 closes the through hole 233 when a hydraulic pressure on the dust collecting filter 22 side is higher than a hydraulic pressure on the valve compartment V side. To the contrary, when the hydraulic pressure on the valve compartment V side is higher than the hydraulic pressure on the dust collecting filter 22 side, the spherical element 234 opens the through hole 233.

The valve element 24 is configured to include a slide member 241 which slides in an interior of the protruding portion 21C of the valve housing 21 and a needle member 242 which is mounted at a lower end of the slide member 241. An upper end portion of the slide member 241 protrudes from an upper end face of the valve housing 21 in such a state that the electromagnetic coil 29 is de-energized.

The return spring 25 is made up of a coil spring and is interposed between the valve seat constituting material 23 and the valve element 24 in a compressed state, so as to bias the valve element 24 towards the movable core 26.

The movable core 26 is made of a magnetic material and moves in an interior of the cover 27 in a vertical direction in such a state that a lower end surface thereof is in abutment with an upper end face of the valve element 24. Namely, when the electromagnetic coil 29 is energized, the movable core 26 is attracted by the valve housing 21 which is the stationary core to thereby be caused to move downwards, so as to push the valve element 24 downwards.

The cover 27 exhibits a bottomed cylindrical shape and is placed over an upper portion of the valve housing 21 (or more specifically, an upper half portion of the protruding portion 21C). In addition, the cover 27 is welded along the full circumference thereof to thereby be fixedly secured to the valve housing 21.

The second dust collecting filter 28 is such as to be disposed in such a manner as to surround a through hole 213a in the valve housing 21 and is mounted in such a manner as to extend annularly along the valve compartment constituting portion 213 of the insertion portion 21A of the valve housing 21. As shown in FIG. 4, the second dust collecting filter 28 is configured to include a pair of upper and lower annular rings 281, 281 and a net-like element 282 which is held by these annular rings 281, 281.

In addition, the electromagnetic coil 29 shown in FIG. 3 is assembled in place in the cover 9 (refer to FIG. 1) and is then mounted annularly on the valve housing 21 and the protruding portion 21C when the housing 9 is mounted on the base body 1.

The electromagnetic valve 2, which is configured as has been described heretofore, is closed when the electromagnetic coil 29 is energized and is opened when the electromagnetic coil 29 is de-energized. Namely, when the electromagnetic coil 29 is energized based on a command from the electronic control unit 8 (refer to FIG. 1), the movable core 26 is attracted by the valve housing 21, which is the stationary core, and is then caused to move downwards. Along with this, the valve element 24 moves downwards to be seated on the valve seat 231 of the valve seat constituting material 23 at the lower end portion (the needle member 242) thereof, so as to close the hollow portion 232. In addition, when the electromagnetic coil 29 is de-energized, the valve element 24 and the movable core 26 are pushed back in an upward direction by virtue of the biasing force of the return spring 25, whereby the lower end portion (the needle member 242) of the valve element 24 moves apart from the valve seat 231, so as to open the hollow portion 232.

Referring to FIGS. 5 to 7, a method for producing the vehicle brake hydraulic pressure control unit U will be described.

Figure 5A:
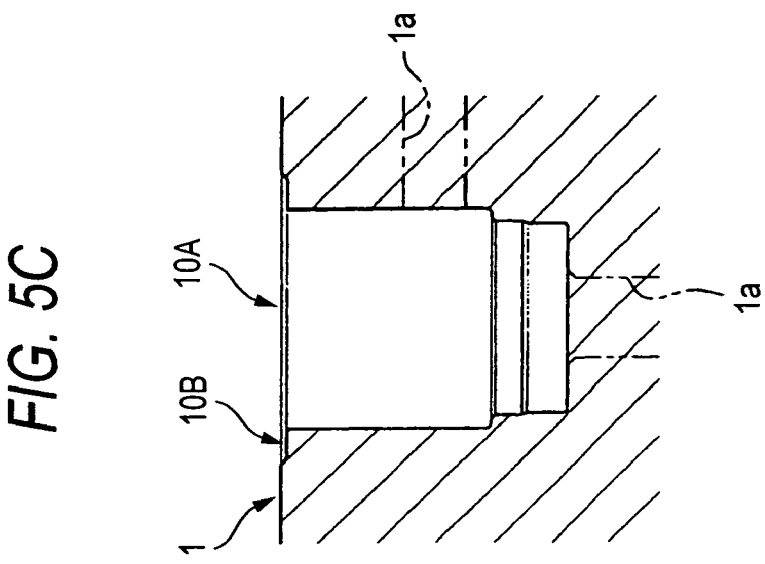
FIGS. 5A to 5C are sectional views which explain a drilling step of a method for producing the vehicle brake hydraulic pressure control unit according to the first embodiment of the invention.
Figure 5B:
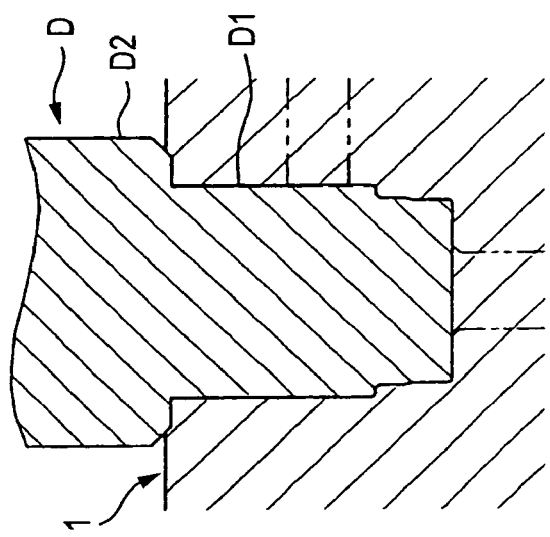
Figure 5C:
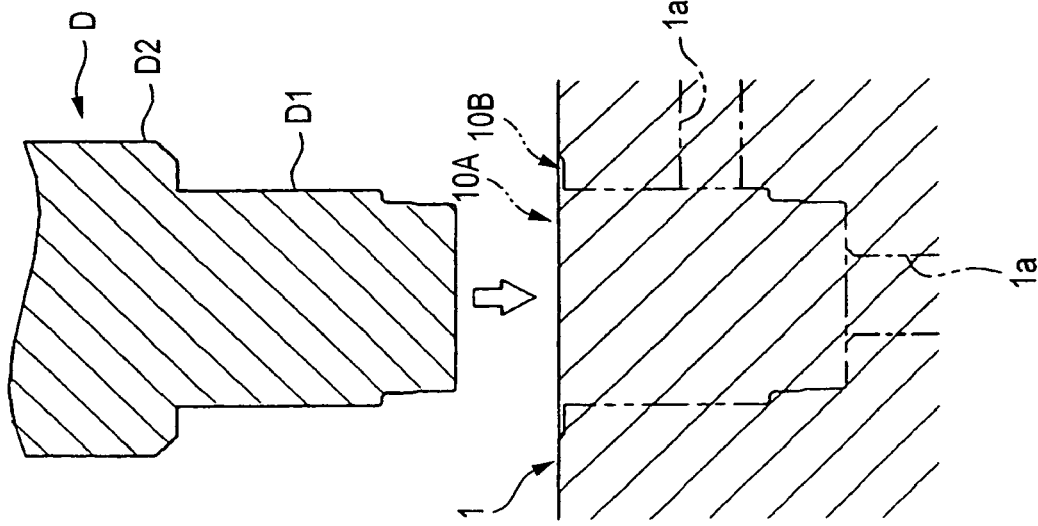

Firstly, as shown in FIG. 5A, a mounting hole portion 10A and a recessed portion 10B are formed in a base body 1 which is formed into a predetermined shape (a drilling step). The mounting hole portion 10A and the recessed portion 10B are formed integrally through a single step by employing a stepped drilling tool D. The drilling tool D includes a lower stepped portion D1 having a cutting blade for forming the mounting hole portion 10A and an upper stepped portion D2 having a cutting blade for forming the recessed portion 10B. Then, as shown in FIGS. 5B and 5C, when the drilling tool D is pressed against a surface of the base body 1 while rotating the drilling tool D, the mounting hole portion 10A is formed by the lower stepped portion D1. Following this, the recessed portion 10B is formed by the upper stepped portion D2.

In addition, although the illustration of forming them is omitted here, before and after the operations described above, holes (bores) for mounting the normally closed electromagnetic valve 3, the reservoir 4, the pump 5 (refer to FIG. 1) and the like are formed in appropriate locations in the base body 1, and brake fluid flow paths 1a and the like are formed in an interior of the base body 1 by cutting surfaces of the base body 1.

Next, as shown in FIGS. 6A and 6B, the normally open electromagnetic valve 2 is inserted into the mounting hole portion 10A, and the lower end surface thereof is brought into abutment with the bottom surface 16 of the mounting hole portion 10A (an inserting step). Namely, as shown in FIG. 4, the press-fit portion 211 of the electromagnetic valve 2 is press fitted in the abutment portion 11 of the mounting hole portion 10A, and the full circumference of the lower end surface of the small diameter portion 212 is brought into abutment with the bottom surface 16 of the mounting hole portion 10A while joining the outer circumferential surface of the press-fit portion 211 to the inner circumferential surface of the abutment portion 11. In this embodiment, since the tapered portion 13 formed between the abutment portion 11 and the introducing portion 12 of the mounting hole portion 10A and the small diameter portion 211 formed at the lower end portion of the electromagnetic valve 2 both function as a "guide" for the electromagnetic valve 2, the press-fit portion 211 of the electromagnetic valve 2 can be press fitted in the abutment portion 11 of the mounting hole portion 10A in a simple and ensured fashion.

According to this embodiment, the accommodation space K is defined by the outer circumferential surface of the small diameter portion 212 and the inner circumferential surface of the abutment portion 11 of the mounting hole portion 10A when the press-fit portion 211 of the electromagnetic valve 2 is press fitted in the abutment portion 11 of the mounting hole portion 10A and the lower end surface of the small diameter portion 212 is brought into abutment with the bottom surface 16 of the mounting hole portion 10A. Therefore, chippings or the like which are produced in association with the press fitting of the electromagnetic valve are accommodated within the accommodation space K so defined. Furthermore, the inserting position of the electromagnetic valve 2 comes to be restricted vertically (in a depth direction) as well as radially.

Following this, the hole wall of the mounting hole portion 10A is clamped based on the inserting position of the electromagnetic valve 2, so as to fix the electromagnetic valve 2 in place (a fixing step). Namely, as shown in FIG. 6C, a clamping jig E which exhibits a bottomed cylindrical shape is pressed against the bottom surface 17 of the recessed portion 10B while maintaining the state in which the lower end surface is in abutment with the bottom surface 16 of the mounting hole portion 10A, so that the hole wall of the mounting hole portion 10A is pressed downwards (towards the bottom surface 16) by the clamping jig E so as to form a plastically deformed portion 18 (refer to FIG. 4). The plastically deformed portion 18 so formed is then made to be locked in the locking groove 214 (refer to FIG. 4) formed on the outer circumferential surface of the electromagnetic valve 2, whereby the electromagnetic valve 2 is clamped and fixed in place in the mounting hole portion 10A. By pressing the bottom surface 17 of the recessed portion 10B towards the bottom surface 16 of the mounting hole portion 10A after the electromagnetic valve 2 has been inserted into the mounting hole portion 10A so as to form the plastically deformed portion 18, the electromagnetic valve 2 is held in the mounting hole portion 10A in such a manner as not to be dislocated therefrom, and also is sealed fluid tightly by virtue of a residual radial stress in the plastically deformed portion 18. In addition, in this embodiment, the inserting position of the electromagnetic valve is restricted by joining the outer circumferential surface of the lower end portion of the electromagnetic valve 2 to the inner circumferential surface of the abutment portion 11 of the mounting hole portion 10A and bringing the whole circumference of the lower end surface of the electromagnetic valve 2 into abutment with the bottom surface 16 of the mounting hole portion 10A and the hole wall of the holding portion 14 of the mounting hole portion 10A which does not contribute to the positioning of the electromagnetic valve 2 is clamped while the inserting position is maintained. Accordingly, the electromagnetic valve 2 is made difficult to be inclined when the electromagnetic valve 2 is fixed.

Figure 7A:
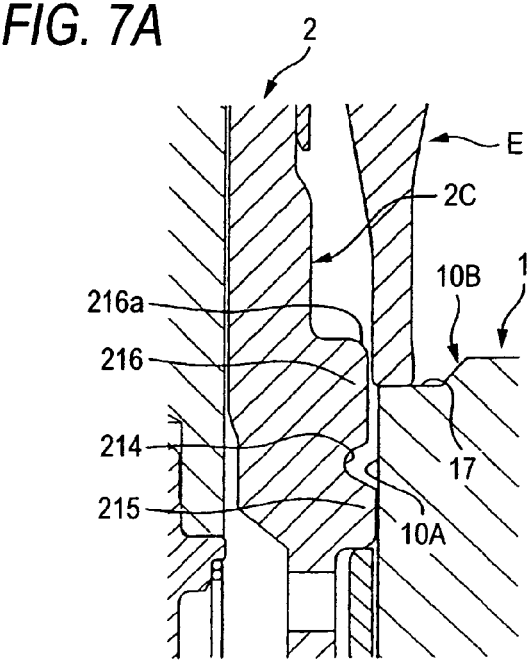
FIGS. 7A to 7D are sectional views which explain in detail the fixing step.

Referring to FIGS. 7A to 7D, the fixing step will be described in greater detail. Firstly, as shown in FIG. 7A, a full circumference of a lower end surface of the clamping jig E is brought into abutment with an inner circumferential edge of the bottom surface 17 of the recessed portion 10B. Note that while an inside diameter of the clamping jig E is substantially the same as an outside diameter of the upper lid 216 of the electromagnetic valve 2, since the upper circumferential edge portion 216a of the upper lid 216 of the electromagnetic valve 2 is chamfered, the clamping jig E can be positioned in a smooth fashion. Namely, when the clamping jig E is placed over the electromagnetic valve 2, since the lower end portion of the clamping jig E is guided by the circumferential edge portion 216a, the full circumference of the lower end surface of the clamping jig E can be brought into abutment with the bottom surface 17 of the recessed portion 10B in an ensured fashion.

Figure 7B:
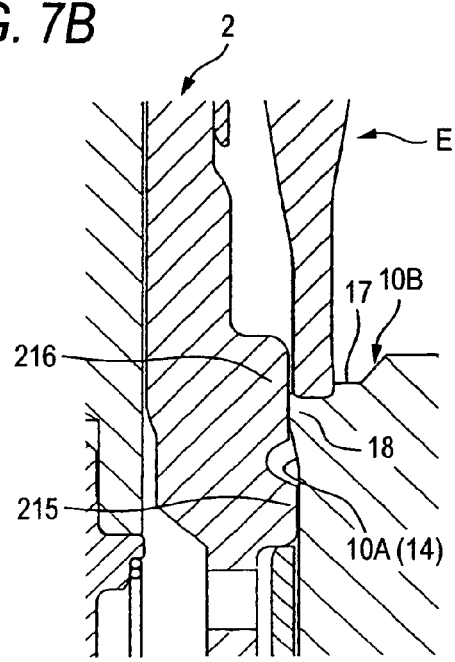
Figure 8:
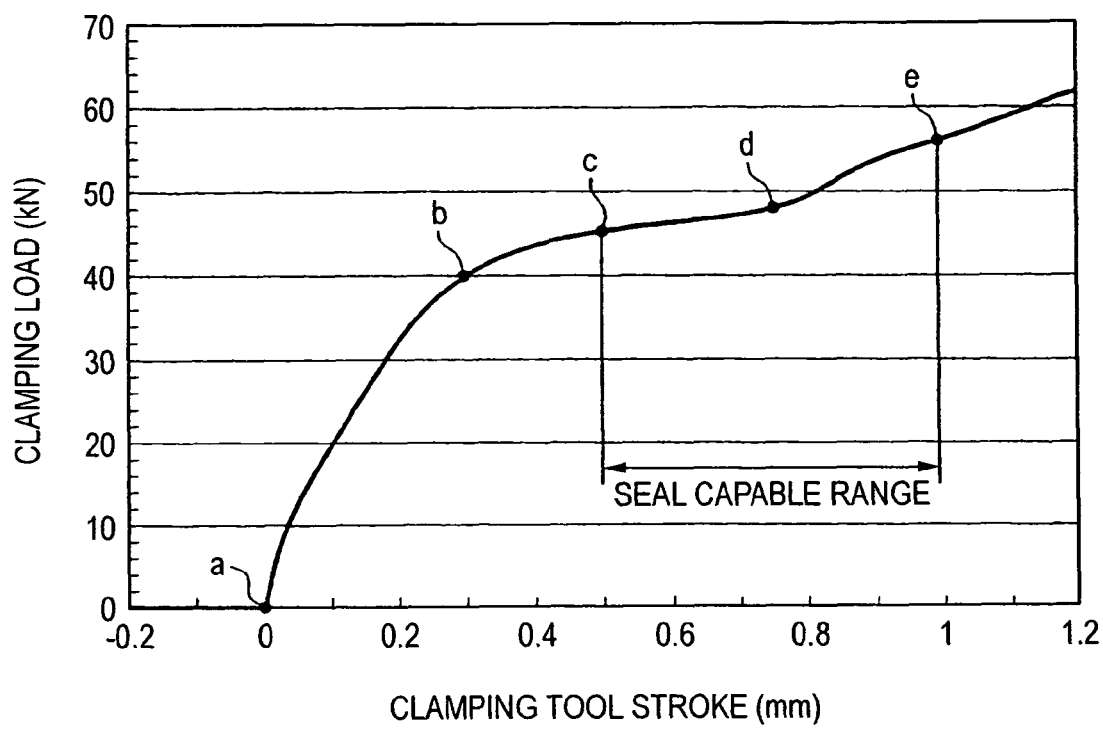
FIG. 8 is a graph showing a transition of clamping load.

Next, a downward clamping load is applied to the clamping jig E ("a"→"b" in a graph shown in FIG. 8), and the lower end portion of the clamping jig E is, as shown in FIG. 7B, caused to sink into the bottom surface 17 of the recessed portion 10B. Note that since the gap is defined between the inner circumferential surface of the holding portion 14 of the mounting hole portion 10A and the outer circumferential surface of the upper lid 216 of the electromagnetic valve 2 (refer to FIG. 7A), when the lower end portion of the clamping jig E is caused to sink into the bottom surface 17 of the recessed portion 10B, the hole wall of the mounting hole portion 10A at the holding portion 14 is plastically deformed (plastically flows) towards the upper lid 216 of the electromagnetic valve 2, whereby the full circumference of the inner circumferential surface of the holding portion 14 (refer to FIG. 3) of the mounting hole portion 10A comes to be joined to the outer circumferential surface of the upper lid 216 of the electromagnetic valve 2. Incidentally, since the gap is defined between the inner circumferential surface of the holding portion 14 of the mounting hole portion 10A and the outer circumferential surface of the upper lid 216 of the electromagnetic valve 2, the hole wall of the mounting hole portion 10A can be plastically deformed with a small clamping load.

Figure 7C:
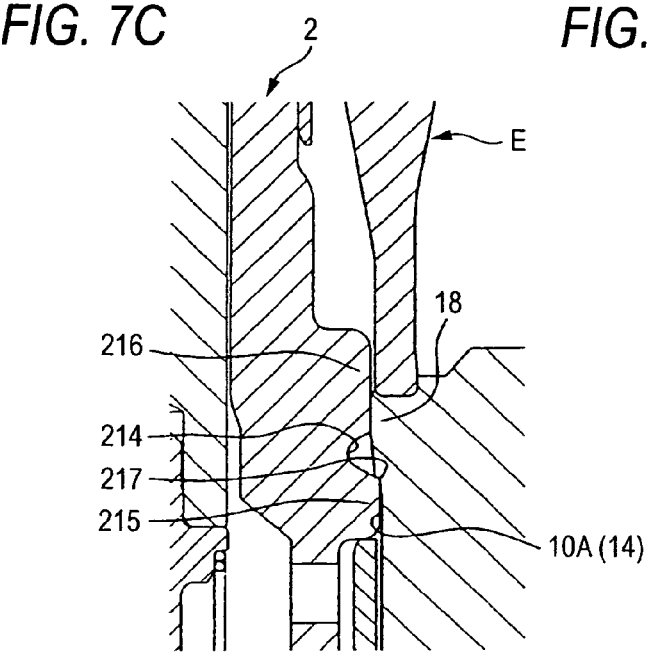

When the clamping load is increased ("b"→"c" in the graph shown in FIG. 8), the lower end portion of the clamping jig E is made to sink deeper as shown in FIG. 7C. In association with this, the hole wall of the mounting hole portion 10A is pushed out over an upper side of the lower lid 215 of the electromagnetic valve 2 so as to press hold a boundary portion 217 between the lower lid 215 and the locking groove 214 along the full circumference thereof. In addition, at this point in time, the electromagnetic valve 2 is locked by the plastically deformed portion 18 in such a manner as not to be dislocated from the mounting hole portion 10A and a seal is established between the holding portion 14 of the mounting hole portion 10A and the lower lid 215 of the electromagnetic valve 2 by virtue of the residual radial stress in the plastically deformed portion 18.

Figure 7D:
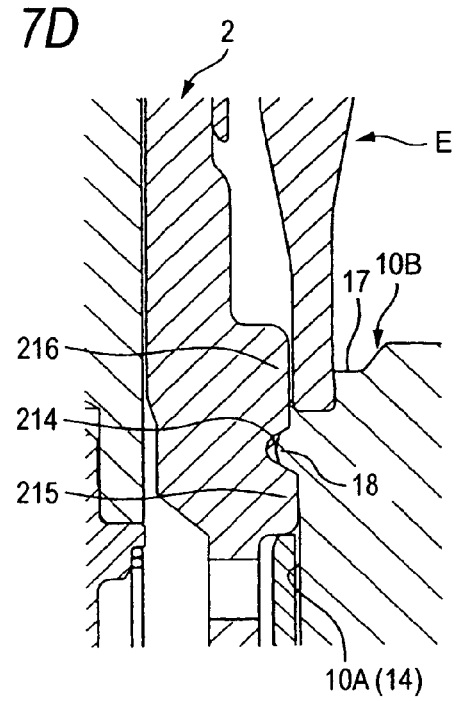

When the clamping force is increased further ("c"→"d" in the graph shown in FIG. 8), the plastic deformation (plastic flowing) is developed further by the hole wall of the mounting hole portion 10A, as shown in FIG. 7D, the plastically deformed portion 18 formed on the hole wall of the mounting hole portion 10A comes to enter the locking groove 214 on the electromagnetic valve 2.

In addition, when the clamping load is increased far more ("d"→"e" in the graph shown in FIG. 8), although an illustration thereof is omitted, the whole of the locking groove 214 of the electromagnetic valve 2 is filled with the plastically deformed portion 18 of the mounting hole portion 10A. Thus, in the vehicle brake hydraulic pressure control unit U, the stroke and clamping load of the clamping jig E are controlled so that they fall within ranges defined from "c" to "e" shown in FIG. 8, the aforesaid location can be sealed.

Before or after the normally open electromagnetic valve 2 is assembled, when the normally closed electromagnetic valve 3, the reservoir 4, the pump 5, the pressure sensor 6, the motor 7 and the like are, as shown in FIG. 1, assembled on to the base body 1 and the housing 9 is assembled further to cover the electromagnetic valves 2, 3, the vehicle brake hydraulic pressure control unit U is then completed.

According to the vehicle brake hydraulic pressure control unit U that has been described heretofore, even in the event that chippings are produced when press fitting the electromagnetic valve 2 in the mounting hole portion 10A in the base body 1, since the chippings so produced are accommodated in the accommodation space K, the mixing of the chippings into the brake fluid can be prevented. Namely, an increase in sliding resistance at the sliding portion of the vehicle brake hydraulic pressure control unit U can be suppressed, and furthermore, the wear of the seal portion can be prevented.

Furthermore, in the vehicle brake hydraulic pressure control unit U, the recessed portion 10B is formed along the periphery of the mounting hole portion 10A, the bottom surface 17 of the recessed portion 10B is formed so that the bottom surface 16 of the mounting hole portion 10A is as a standard, and the lower end surface of the electromagnetic valve 2 is brought into abutment with the bottom surface 16 of the mounting hole portion 10A. Accordingly, deviation in magnitude of the clamping load is made difficult to occur when the electromagnetic valve 2 is fixed in place in the mounting hole portion 10A. Namely, although the stroke of the clamping jig E is dependent on the distance from the surface of the base body 1 (in this embodiment, the bottom surface 17 of the recessed portion 10B) to the locking groove 214 of the electromagnetic valve 2, in this vehicle brake hydraulic pressure control unit U, deviation in depth of the mounting hole portion 10A (namely, a distance from the bottom surface 16 of the mounting hole portion 10A to the bottom surface 17 of the recessed portion 10B) is made difficult to occur due to the bottom surface 17 of the recessed portion 10B being formed based on the bottom surface 16 of the mounting hole portion 10A. Furthermore, deviation in amount in which the electromagnetic valve 2 is inserted is made difficult to occur due to the lower end surface of the electromagnetic valve 2 being brought into abutment with the bottom surface 16 of the mounting hole portion 10A. Consequently, deviation in distance from the bottom surface 17 of the recessed portion 10B to the locking groove 214 of the electromagnetic valve 2 is also made difficult to occur. As a result of this, deviation in amount in which the plastically deformed portion 18 is filled in the locking portion 214 is made difficult to occur.

In particular, in this embodiment, since the mounting hole portion 10A and the recessed portion 10B are formed integrally by the same drilling tool D, deviation in depth of the mounting hole portion 10A is decreased to an extremely low level, and deviation in distance from the bottom surface 17 of the recessed portion 10B to the locking groove 214 of the electromagnetic valve becomes dependent only on the production accuracy of the electromagnetic valve 2. Namely, according to the vehicle brake hydraulic pressure control unit U, the deviation in distance from the bottom surface 17 of the recessed portion 10B to the locking groove 214 of the electromagnetic valve 2 becomes extremely small, and consequently, deviation in stroke of the clamping jig E also becomes extremely small.

In addition, in the vehicle brake hydraulic pressure control unit U, the outside diameter of the electromagnetic valve 2 at the upper side of the locking groove 214 is made smaller than the outside diameter of the electromagnetic valve 2 at the lower side of the locking groove 214. Therefore, the hole diameter of the mounting hole portion 10A after plastic deformation (clamping) becomes smaller at the upper side than at the lower side of the locking groove 214. Consequently, when force is applied to the electromagnetic valve 2 in a direction in which the electromagnetic valve 2 is pushed out from the mounting hole portion 10A, a shear fracture plane is, as shown in FIG. 9A, formed in such a manner as to rise obliquely upwards from the lower outer circumferential edge of the locking groove 214 (the boundary portion 217 between the lower lid 215 and the locking groove 214). In the event that the outside diameter of the electromagnetic valve 2 becomes the same at an upper side as at a lower side of a locking groove 214' as shown in FIG. 9B, a shear fracture distance S2 becomes equal to the groove width of the locking groove 214'. However, as shown in FIG. 9A, in the event that the hole diameter at the upper side of the locking groove 214 is made smaller than the hole diameter at the lower side thereof, a shear fracture distance S1 becomes equal to or larger than the groove width of the locking groove 214. Therefore, even in the event that the groove width of the locking groove 214 is made smaller than the groove width of the locking groove 214', an assembling strength (a resisting force against the push-out force by the brake hydraulic pressure) which is equal to that produced in the case shown in FIG. 9B can be secured.

In addition, in the vehicle brake hydraulic pressure control unit U, since the gap is defined at the upper side of the locking groove 214, the plastically deformed portion 18 can be formed with a small clamping load. Hence, a reduction in size of the production equipment can be attained.

Figure 10A:
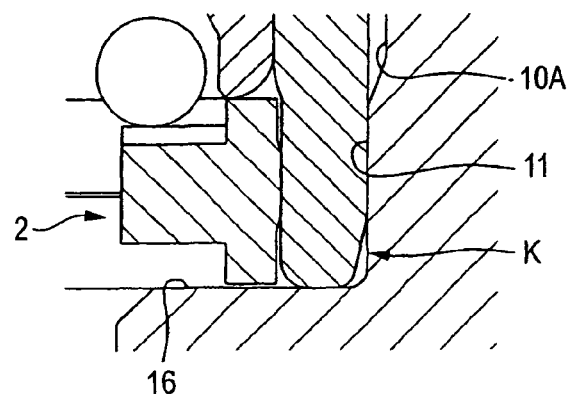
FIG. 10A is an enlarged sectional view of FIG. 4.
Figure 10B:
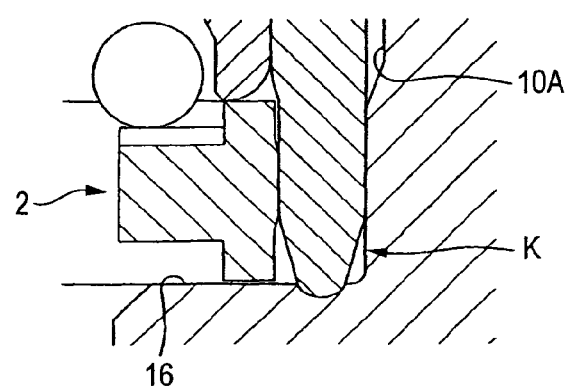
FIGS. 10B to 10D are enlarged sectional views showing modified examples made to the vehicle brake hydraulic pressure control unit according to the first embodiment of the invention.

Note that there will be no problem even in the event that the configuration of the vehicle brake hydraulic pressure control unit is modified as required. For example, while in the embodiment, the lower end surface of the electromagnetic valve 2 is formed into the flat shape so as to be brought into abutment with the bottom surface 16 of the mounting hole portion 10A, a lower end surface of an electromagnetic valve 2 may be formed into a shape which is convex relative to a bottom surface 16 of a mounting hole portion 10A as shown in FIG. 10B, so as to be made to sink into the bottom surface 16 of the mounting hole portion 10A. By adopting this configuration, since the contact surface pressure between the lower end surface of the electromagnetic valve 2 and the bottom surface 16 of the mounting hole portion 10A is increased, the closeness of the accommodation space K is increased further.

Figure 10C:
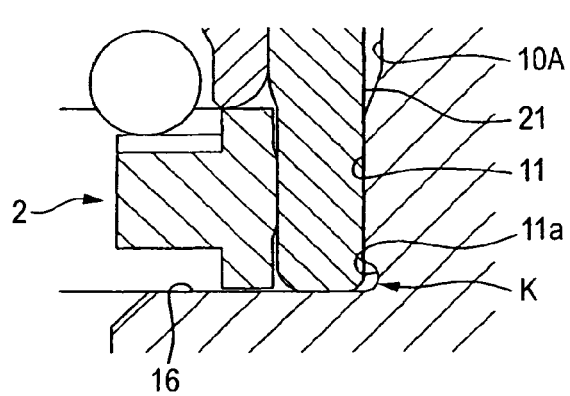

In addition, as shown in FIG. 10C, a circumferential surface groove 11a may be provided on an inner circumferential surface of an abutment portion 11 of a mounting hole portion 10A by setting back a relevant location into the inner circumferential surface along the circumferential direction, so as to form an accommodation space K by making use of the circumferential surface groove 11a. Namely, part of the abutment portion 11 of the mounting hole portion 10A may be expanded diametrically so as to form the accommodation space K. In addition, while in an electromagnetic valve 2 in FIG. 10C, a small diameter portion 212 (refer to FIG. 4) is omitted, the accommodation space K is secured by providing the circumferential surface groove 11a. Since working on an electromagnetic valve 2 can be omitted or simplified in the event that an accommodation space K is formed by working on a mounting hole portion 10A, a conventional electromagnetic valve can be carried over for assembly into the mounting hole portion 10A so worked. In addition, in the event that working on an electromagnetic valve 2 is simplified, an accommodation space K can be secured without reducing the strength of a valve housing 21 or the like of the electromagnetic valve 2.

Figure 10D:
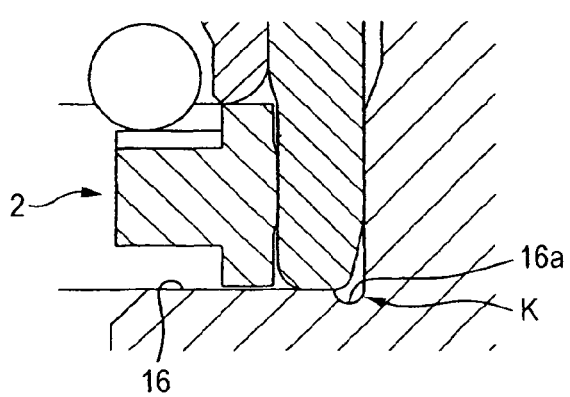

Furthermore, as shown in FIG. 10D, a bottom surface groove 16a may be provided on a bottom surface 16 of a mounting hole portion 10A by setting back a relevant location into the bottom surface 16 along an outer circumference thereof, so as to form an accommodation space K by making use of the bottom surface groove 16a so provided. In addition, the bottom surface groove 16a can be formed by a candle type drill, the bottom surface groove 16a can be formed more simply and inexpensively than the circumferential surface groove 11a shown in FIG. 10C.

In addition, while in the embodiment, the example is illustrated in which the plastically deformed portion 18 is formed without heating the hole wall of the mounting hole portion 10A, the invention is not limited thereto. The plastically deformed portion 18 may be formed while heating the hole wall of the mounting hole portion 10A. Namely, in the fixing step, a plastically deformed portion 18 is formed by pressing the hole wall of the mounting hole portion 10A towards the bottom surface 16 while heating the hole wall, and the plastically deformed portion 18 so formed is caused to enter the locking groove 214 formed on the outer circumferential surface of the electromagnetic valve 2, whereby the electromagnetic valve 2 is fixed in place. Since the hole wall is softened when it is heated, a load (a clamping load) necessary to deform the hole wall plastically can be made small. In addition, since the hole wall of the mounting hole portion 10A is softened, even in the event that the base body 1 is made of an Al—Cu—Si based cast alloy which has a low ductility, the plastically deformed portion 18 can be formed without generating a crack (destruction in material) in the hole wall of the mounting hole portion 10A. Note that in this embodiment, since the base body 1 is made of aluminum alloy, a heating temperature desirably falls in the range of 200 to 260° C.

A fixing method for an electromagnetic valve 2 like those described above can be realized by employing a clamping device F shown in FIG. 11. The clamping device F is configured to include a support table F1 which holds the base body 1, a first electrode F2 which is electrically connected to the base body 1, a pressurizing cylinder F3 for pressing the first electrode F2 against the base body 1 and pressing the base body 1 against the support table F1, a bottomed cylindrical clamping jig F4 for pressing the hole wall of the mounting hole portion 10A (refer to FIG. 2), a holder F5 for holding the clamping jig F4, a second electrode F6 which is electrically connected to the clamping jig F4, and a press F7 for pressing the second electrode F6 against the clamping jig F4 and imparting a downward pressure (a clamping load) to the clamping jig F4.

Then, both the electrodes F2, F6 are energized when pressing the hole wall of the mounting hole portion 10A towards the bottom surface 16 by means of the clamping jig F4, the hole wall of the mounting hole portion 10A is heated on the periphery of a contact portion between the clamping jig F4 and the bottom surface 17 of the recessed portion 10B.

Since the hole wall can locally be heated only in the vicinity of the claming jig F4 in the event that the clamping device F is used, the modification in quality of the base body 1 due to heat applied can be suppressed to a required minimum level. In addition, since the hole wall of the mounting hole portion 10A is softened and the clamping load is decreased, the durability of the clamping jig F4 can be increased remarkably. In addition, when clamping is carried out while energizing the electrodes, energization properties can be secured by taking a countermeasure of not performing anodic oxidation coating (anodized aluminum) on to a portion of the base body 1 with which the electrode is brought into abutment.

Second Embodiment

In a second embodiment, a case will be illustrated in which a pump 5 constitutes an assembled part. Note that as shown in FIG. 1, a mounting hole portion 10C in which a pump 5 is mounted and a recessed portion 10D which is formed in such a manner as to surround an opening in the mounting hole portion 10C are formed in a base body 1.

Firstly, referring to FIG. 12, the configurations of the mounting hole portion 10C and the recessed portion 10D will be described. Note that while in FIG. 12, the mounting hole portion 10C is illustrated as being formed horizontally, when "upper" and "lower" are used in the following description, a surface side of the base body 1 (a left side in FIG. 12) is regarded as an "upper side" and a motor mounting hole portion 10G side thereof (a right side in FIG. 12) is regarded as a "lower side" based on a state in which the pump 5 is assembled in place in the mounting hole portion 10C (refer to FIG. 13).

The mounting hole portion 10C is a hole which is formed in such a manner as to communicate with two flow paths 1e, 1e which are formed in an interior of the base body 1. In addition, a bottom portion (a deepest portion) of the mounting hole portion 10C is made to open to a motor mounting hole portion 10G in which an eccentric shaft portion 71 of a motor 7 (refer to FIG. 1) is accommodated. More specifically, the mounting hole portion 10C is a stepped cylindrical hole which increases its diameter as it extends from a deeper portion to a shallower portion thereof. The mounting hole portion 10C also includes a loosely inserting portion 101 which is positioned in the deepest portion, a cylindrical seal portion 102 which is formed in a location shallower (a location upper) than the loosely inserting portion 101, a cylindrical abutment portion 103 which is formed in a location shallower (a location upper) than the seal portion 102, and a cylindrical holding portion 104 which is formed in a location shallower (a location upper) than the abutment portion 103. Note that a diameter of the mounting hole portion 10C at the seal portion 102 is larger than a diameter at the loosely inserting portion 101, a diameter at the abutment portion 103 is larger than the diameter at the seal portion 102, and a diameter at the holding portion 104 is larger than the diameter at the abutment portion 103.

The recessed portion 10D exhibits a circular belt-like shape as viewed from the top and is formed concentrically with the mounting hole portion 10C. A bottom surface 105 of the recessed portion 10D is formed based on a stepped portion 107 between the abutment portion 103 and the holding portion 104. Namely, the recessed portion 10D is not formed by specifying a depth from a surface 1d of the base body 1 but is formed by specifying a depth from the bottom surface 105 of the recessed portion 10D to the stepped portion 107 between the abutment portion 103 and the holding portion 104. In addition, the stepped portion 107 between the abutment portion 103 and the holding portion 104 and the bottom surface 105 of the recessed portion 10D are made parallel to each other.

Next, the configuration of the pump 5 will be described by reference to FIG. 13. The pump 5 is configured to include a cylinder 51, a plunger 52, a return spring 53, a seal stopper 54, an inlet valve system 55, a cap 56, an outlet valve system 57 and an outlet filter 58.

The cylinder 51 is a bottomed cylindrical metallic member whose inner circumferential surface is formed into a shape of cylindrical surface and defines an inlet valve compartment K2 which accommodates the inlet valve system 55. The cylinder 51 is configured to include a small diameter portion 511 which faces the abutment portion 103 of the mounting hole portion 10C with a gap defined therebetween, a press-fit portion 512 which is press fitted in an upper portion of the abutment portion 103, a locking portion 513 whose diameter is larger than that of the press-fit portion 512 and which is adapted to be locked on the stepped portion between the abutment portion 103 and the holding portion 104 of the mounting hole portion 10C, and a cylinder bottom portion 514 whose diameter is smaller than that of the locking portion 513 and which is adapted to be fitted in a large-diameter recessed portion 56a of the cap 56. Note that a through hole which constitutes an outlet path 51a through which brake fluid let into the inlet valve compartment K2 is made to be discharged towards the cap 56 is formed in a central portion of the cylinder bottom portion 514.

The plunger 52 is such as to reciprocate in association with a rotary movement of the eccentric shaft portion 71 of the motor 7 (refer to FIG. 1). The plunger 52 includes a slide portion 521 which reciprocates in an interior of the cylinder 51 in a sliding fashion, a contact portion 522 which is brought into abutment with the eccentric shaft portion 71 of the motor 7, and a inlet portion 523 which is formed between the slide portion 521 and the contact portion 522. In addition, an inlet path 52a is formed in an interior of the plunger 52. The inlet path 52a is such as to establish a communication between an annular space K1 which is formed on the periphery of the inlet portion 523 and the inlet valve compartment K2 and is made to open to an outer circumferential surface of the plunger 52 (an outer circumferential surface of the inlet portion 523) and an upper end face of the plunger 52. Note that a seal member 522a which is brought into abutment with the seal portion 102 of the mounting hole portion 10C and a bush 522b are mounted on the contact portion 522 in such a manner as to freely slide.

The return spring 53 is disposed in the inlet valve compartment K2 in a compressed state and is adapted to push the plunger 52 towards the motor mounting hole portion 10G by virtue of its restoring force. The return spring 53 is disposed between the cylinder bottom portion 514 of the cylinder 51 and a seal ring 524 annularly mounted on the seal ring 524, so as to apply a pressure to the plunger 52 via the seal ring 524. Note that the seal ring 524 fluid tightly seals the interior of the inlet valve compartment K2 while sliding along an inner circumferential portion of the cylinder 51.

The seal stopper 54 is a frame-shaped member for preventing the dislocation of the seal member 522a, is disposed so as to surround the inlet portion 523 of the plunger 52 and is held on the cylinder 51.

The inlet valve system 55 is configured to include a spherical inlet valve element 551 which is disposed so as to close an opening in the inlet path 52a, a retainer 552 which is disposed so as to cover the inlet valve element 551 and an inlet valve spring 553 which is disposed in a compressed state between the inlet valve element 551 and the retainer 552. The inlet valve element 551 is biased towards the plunger 52 by a restoring force of the inlet valve spring 553. Note that the retainer 552 is press held to the seal ring 524 by the return spring 53.

The cap 56 is made up of a bottomed cylindrical metallic member which is separate from the cylinder 51, and formed in an interior thereof are the large-diameter recessed portion 56a in which the cylinder bottom portion 514 is press fitted and a small-diameter recessed portion 56b whose diameter is smaller than that of the large-diameter recessed portion 56a. The small-diameter recessed portion 56b makes up, together with the cylinder bottom portion 514, an outlet valve compartment K3 which accommodates the outlet valve system 57 and the outlet filter 58.

Figure 14:
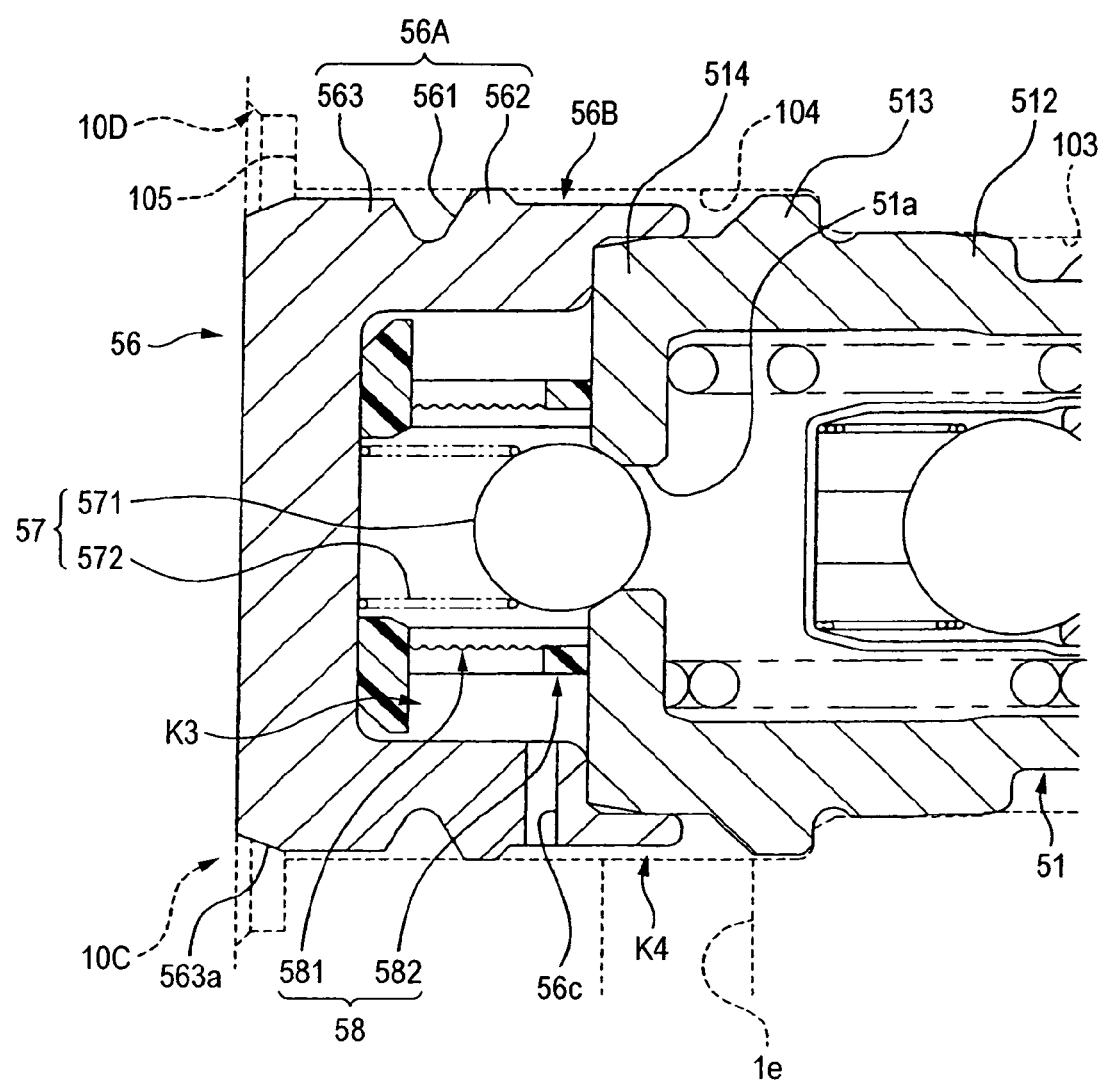
FIG. 14 is an enlarged sectional view of FIG. 13.

To describe the cap 56 more specifically by reference to FIG. 14, the cap 56 includes a lid portion 56A which closes the opening in the mounting hole portion 10C (refer to FIG. 12) and a flow path constituting portion 56B which faces the mounting hole portion 10C with a gap defined therebetween.

An annular locking groove 561 is provided on an outer circumferential surface of the lid portion 56A by setting back a relevant location into the outer circumferential surface along a circumferential direction thereof. A plastically deformed portion 106 that is formed on a hole wall of the mounting hole portion 10C is made to enter in the locking groove 561 (refer to FIG. 15B).

In the lid portion 56A, an outside diameter at a location lying adjacent to an upper side of the locking groove 562 is made smaller than an outside diameter at a location lying adjacent to a lower side of the locking groove 561. Note that in the following description, a location of the lid portion 56A which is adjacent to the locking groove 561 and which lies further downwards (rightwards in FIG. 14) than the locking groove 561 is referred to as a "lower lid 562" and a location which lies further upwards (leftwards in FIG. 14) than the locking groove 561 is referred to as an "upper lid 563."

The diameter of the lower lid 562 is substantially the same as the diameter of the mounting hole portion 10C at the holding portion 14 or the hole diameter of the holding portion 14 and is inserted into the holding portion 104.

The upper lid 563 protrudes from the bottom surface 105 of the recessed portion 10D when the pump 5 is assembled in place in the mounting hole portion 10C and a circumferential edge portion 563a of a protruding portion is chamfered. The outside diameter of the upper lid 563 is made smaller than the hole diameter of the holding portion 14 of the mounting hole portion 10C, and an outer circumferential surface thereof faces an inner circumferential surface of the holding portion 104 with a gap defined therebetween before clamping is implemented.

The flow path constituting portion 56B is a portion which lies underneath the lid portion 56A. The outside diameter of the flow path constituting portion 56B is made smaller than the outside diameter of the lower lid 562, and an outer circumferential surface of the flow path constituting portion 56B and the holding portion 104 of the mounting hole portion 10C define an annular space K4 which communicates with the flow path 1e which is made to open to the holding portion 104. In addition, an exit hole 56c is formed in the flow path constituting portion 56B in such a manner as to establish a communication between the outlet valve compartment K3 and the annular space K4. The exit hole 56c functions as an orifice which relaxes pulsation produced in association with the reciprocating movement of the plunger 52 (refer to FIG. 13).

The outlet valve system 57 is configured to include a spherical valve element 571 which is disposed so as to close the outlet path 51a of the cylinder 51 and an outlet valve spring 572 which is disposed in a compressed state in the outlet valve compartment K3. The outlet valve element 571 is biased towards the outlet path 51a by virtue of the restoring force of the outlet valve spring 572.

The outlet filter 58 is configured to include a filter main body 581 through which brake fluid discharged from the outlet path 51a is passed for removal of undesirable matters and a retaining member 582 for retaining the filter main body 581 and surrounds the outlet valve system 57.

Figure 13:
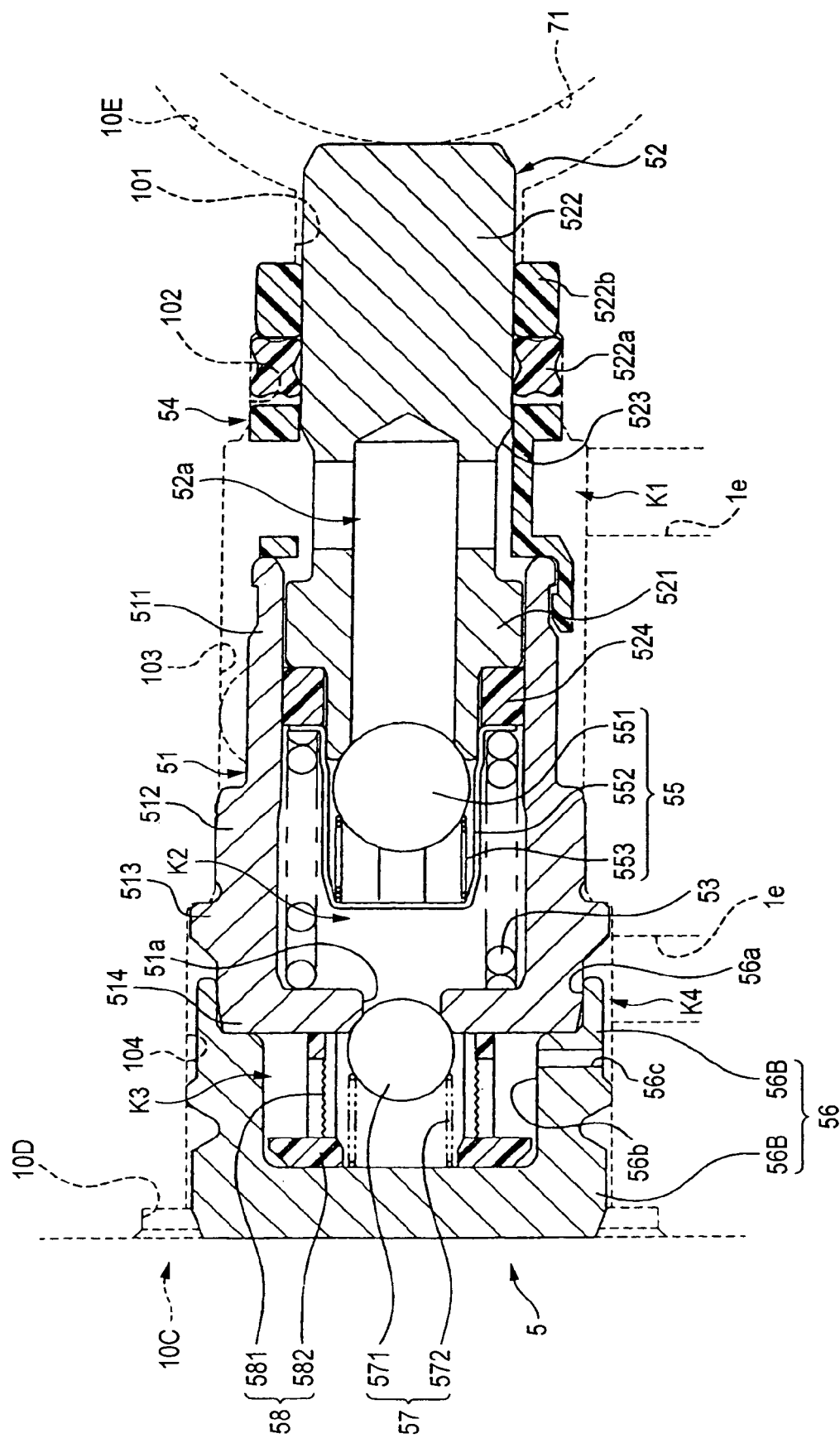
FIG. 13 is a sectional view which explains the configuration of a pump which is an assembled part.

As shown in FIG. 13, the pump 5, which is configured as has been described heretofore, sucks brake fluid into the inlet valve compartment K2 from the flow path 1e which is made to open to a lower portion of the abutment portion 103 of the opening hole 10C via the annular space K1 and the inlet path 52a of the plunger 52 and discharges the brake fluid so sucked to the flow path 1e which is made to open to the holding portion 104 of the mounting hole portion 10C via the outlet path 51a of the cylinder 51, the outlet valve compartment K3, the exit hole 56c in the cap 56 and the annular space K4 through reciprocating motions of the plunger 52 which are caused by eccentric motions of the eccentric shaft portion 71 of the motor 7 (refer to FIG. 1).

Next, a method for assembling the pump 5 on to the base body 1 will be described.

Figure 12:
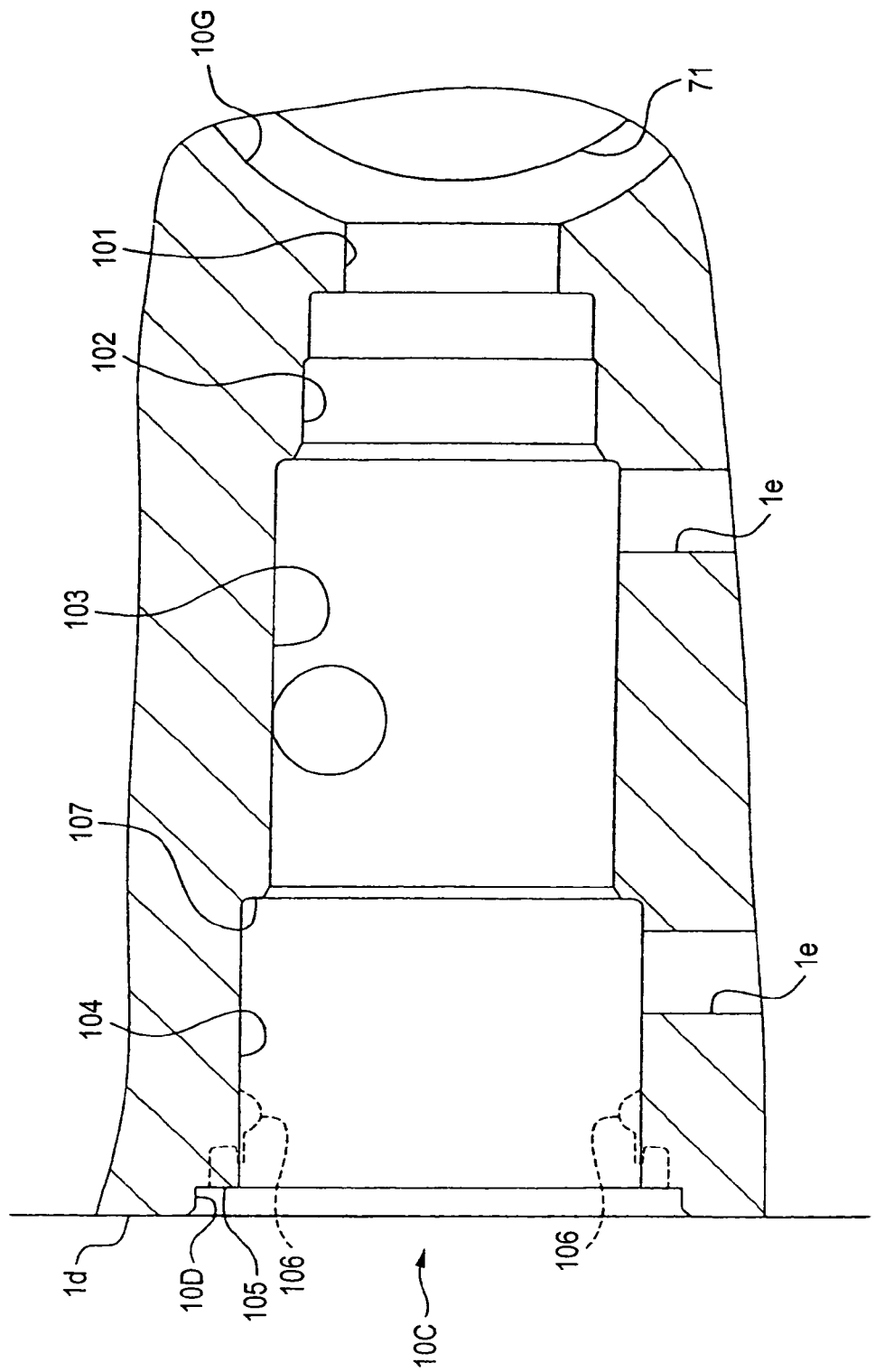
FIG. 12 is a sectional view showing a mounting hole portion of a vehicle brake hydraulic pressure control unit according to a second embodiment of the invention.

As shown in FIG. 12, firstly, a mounting hole portion 10C and a recessed portion 10D are formed in a base body 1 which is formed into a predetermined shape (a drilling step). The mounting hole portion 10C and the recessed portion 10D are formed integrally through one step by employing a stepped drilling tool (whose illustration is omitted).

Next, as shown in FIG. 14, the press-fit portion 512 of the cylinder 51 is press fitted in an upper portion of the abutment portion 103 of the mounting hole portion 10C. The lower lid 562 of the cap 56 is inserted into an upper portion of the holding portion 104 of the mounting hole portion 10C, whereby the locking portion 513 of the cylinder 51 is brought into abutment with the stepped portion between the abutment portion 103 and the holding portion 104 of the mounting hole portion 10C (an inserting step).

Following this, as shown in 15A and 15B, a plastically deformed portion 106 (refer to FIG. 15B) is formed on the hole wall of the mounting hole portion 10C, and the pump 5 is fixed in place (a fixing step). Namely, the plastically deformed portion 106 is formed on the hole wall of the mounting hole portion 10C by press holding a clamping jig G which exhibits a bottomed cylindrical shape against the bottom surface 105 of the recessed portion 10D so as to press the hole wall of the mounting hole portion 10C downwards. Then, the plastically deformed portion 106 so formed is made to enter the locking groove 561 (refer to FIG. 13) of the pump 5, whereby the pump is clamped to be fixed in place in the mounting hole portion 10C. By forming the plastically deformed portion 106, the pump 5 is held in the mounting hole portion 10C in such a manner as not to be dislocated therefrom and also is fluid tightly sealed by virtue of a radial residual stress in the plastically deformed portion 106. In addition, although the inside diameter of the clamping jig G is made substantially the same as the outside diameter of the upper lid 563 of the pump 5, since the circumferential portion 563a of the upper lid 563 is chamfered, the clamping jig G can be positioned in a smooth fashion.

Also, in the second embodiment that has been described above, since the outside diameter of the pump 5 at the upper side of the locking groove 561 is made smaller than the outside diameter thereof at the lower side of the locking groove 561 and as to the hole diameter of the mounting hole portion 10C after plastic deformation (after clamping), the diameter at the upper side is made smaller than the diameter at the lower side of the locking groove 561, a shear fracture distance equal to or larger than the groove width of the locking groove 561 can be secured. As a result, a high assembling strength can be secured.

In addition, since a gap is formed on the periphery of the upper lid 563 at the stage where the pump 5 is inserted into the mounting hole portion 10C (refer to FIG. 15 A), the plastically deformed portion 106 can be formed with a small clamping load Hence, a reduction in size of the production equipment can be realized.

Third Embodiment

In a third embodiment, a case will be illustrated in which a pressure sensor 6 constitutes an assembled part. Note that a mounting hole portion 10E in which a pressure sensor 6 is mounted and a recessed portion 10F which is formed in such a manner as to surround an opening in the mounting hole portion 10E are formed in a base body 1 shown in FIG. 1.

As shown in FIG. 16 A, the mounting hole portion 10E is a bottomed hole which is formed in such a manner as to communicate with a flow path (not shown) which is formed in an interior of the base body 1. The mounting hole portion 10E is a stepped cylindrical hole and includes a loosely inserting portion 111 which lies in a deepest portion and a cylindrical holding portion 112 which is formed in a location which lies shallower (a location which lies upper) than the loosely inserting portion 111. Note that a diameter of the mounting hole portion 10E at the holding portion is made larger than a diameter at the loosely inserting portion 111. The recessed portion 10F exhibits a circular belt-like shape as viewed from the top and is formed concentrically with the mounting hole portion 10E.

A pressure sensor 6 includes, as shown in FIG. 16B, an inserting portion 61 which is inserted into the loosely inserting portion 111 of the mounting hole portion 10E, a lid portion 62 which closes the opening in the mounting hole portion 10E and a protruding portion 63 on which the lid portion 62 is provided in such a manner as to protrude therefrom.

An annular locking groove 621 is provided on an outer circumferential surface of the lid portion 62 by setting back a relevant location into the outer circumferential surface along a circumferential direction thereof. A plastically deformed portion 113 (refer to FIG. 16C) which is formed on a hole wall of the mounting hole portion 10E is made to enter the locking groove 621 so provided.

In the lid portion 62, an outside diameter of a location which is adjacent to an upper side of the locking groove 621 is made smaller than an outside diameter of a location which is adjacent to a lower side of the locking groove 621. Note that in the following description, a location of the lid portion 62 which is adjacent to the locking groove 621 and which lies further downwards than the locking groove 621 is referred to as a "lower lid 622" and a location which lies further upwards than the locking groove 621 is referred to as an "upper lid 623."

The diameter of the lower lid 622 is substantially the same as the diameter of the mounting hole portion 10E at the holding portion 12 or the hole diameter of the holding portion 12 and is inserted into the holding portion 112.

The upper lid 623 protrudes from a bottom surface of the recessed portion 10F when the pressure sensor 6 is assembled in place in the mounting hole portion 10E. The outside diameter of the upper lid 623 is made smaller than the hole diameter of the holding portion 112 of the mounting hole portion 10E and an outer circumferential surface thereof faces an inner circumferential surface of the holding portion 112 with a gap defined therebetween.

A method for assembling the pressure sensor 6 configured as has been described above on to the base body 1 is similar to those for the electromagnetic valve 2 and the pump 5.

Namely as shown in FIG. 16B, the pressure sensor 6 may only have to be fixed by inserting the lower lid 622 of the lid portion 62 of the pressure sensor 6 into the holding portion 112 of the mounting hole portion 10E, bringing a lower surface of the lower lid 622 into abutment with a stepped portion between the loosely inserting portion 111 and the holding portion 112 of the mounting hole portion 10E, and thereafter, as shown in FIG. 16C, forming a plastically deformed portion 113 on the hole wall of the mounting hole portion 10E so as to make the plastically deformed portion 113 so formed enter the locking groove 621 on the pressure sensor 6.

Also, in the third embodiment that has been described above, since the outside diameter of the pressure sensor 6 at the upper side of the locking groove 621 is made smaller than the outside diameter thereof at the lower side of the locking groove 621 and as to the hole diameter of the mounting hole portion 10E after plastic deformation (after clamping), the diameter at the upper side is made smaller than the diameter at the lower side of the locking groove 621, a shear fracture distance equal to or larger than the groove width of the locking groove 621 can be secured, and as a result of this, a high assembling strength can be secured.

In addition, since a gap is formed on the periphery of the upper lid 623 at the stage where the pressure sensor 6 is inserted into the mounting hole portion 10E, the plastically deformed portion 113 can be formed with a small clamping load, and hence, a reduction in size of the production equipment can be realized.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A method for producing a vehicle brake hydraulic pressure control unit comprising:
   drilling a bottomed mounting hole portion in a base body comprising a brake fluid flow path so as to communicate with the flow path;
   inserting an assembled part which comprises a locking groove on an outer circumferential surface thereof into the mounting hole portion so that a lower end surface of the assembled part is brought into abutment with a bottom surface of the mounting hole portion; and
   forming a plastically deformed portion on a hole wall of the mounting hole portion by pressing the hole wall of the mounting hole portion towards the bottom surface of the mounting hole portion so as to bring the plastically deformed portion into engagement with the locking groove to thereby fix the assembled part in place, wherein:
   an upper side of the locking groove is cylindrical,
   an outside diameter at an upper side of the locking groove is made smaller than an outside diameter at a lower side of the locking groove which is cylindrical, and in a state where the plastically defaulted portion is formed, the cylindrical upper side of the locking groove protrudes from a bottom surface of a recessed portion of the mounting hole portion and an inner circumferential surface of the mounting hole portion makes contact with an outer circumferential surface of the cylindrical upper side of the locking groove.

2. The method for producing the vehicle brake hydraulic pressure control unit as set forth in claim 1, wherein
when drilling, the mounting hole portion is formed by a lower stepped portion of a stepped drilling tool, while a recessed portion is formed by an upper stepped portion of the drilling tool in such a manner as to surround an opening of the mounting hole portion, and
when fixing the assembled part in place, the plastically deformed portion is formed by pressing a bottom surface of the recessed portion towards the bottom surface of the mounting hole portion.

3. The method for producing the vehicle brake hydraulic pressure control unit as set forth in claim 1, wherein when fixing the assembled part in place, the plastically deformed portion is formed by pressing the hole wall of the mounting hole portion in the downward direction while heating.

4. The method for producing the vehicle brake hydraulic pressure control unit as set forth in claim 1, wherein the upper side of the locking groove is an upper lip.

5. The method for producing the vehicle brake hydraulic pressure control unit as set forth in claim 1, wherein the smaller diameter at the upper side of the locking groove is:
positioned between the locking groove and a top beveled surface,
makes contact with an inner circumferential wall of the hole wall when forming the plastically deformed portion, and
partially extending outside of the hole wall.

6. The method for producing a vehicle brake hydraulic pressure control unit as set forth in claim 1, wherein the lower side of the locking groove is cylindrical.

7. The method for producing the vehicle brake hydraulic pressure control unit as set forth in claim 1, further comprising fixing the assembled part in place by clamping the mounting hole portion to the assembled part based on an inserting position of the assembled part.

8. The method for producing the vehicle brake hydraulic pressure control unit as set forth in claim 7, wherein the fixing is provided by a clamping jig which exhibits a bottomed cylindrical shape pressed against the bottom surface of the recessed portion of the mounting hole portion.

9. The method for producing the vehicle brake hydraulic pressure control unit as set forth in claim 8, wherein while maintaining a state in which the lower end surface of the assembled part is in abutment with the bottom surface, the hole wall of the mounting hole portion is pressed downwards towards the bottom surface by the clamping jig to form a plastically deformed portion.

10. The method for producing the vehicle brake hydraulic pressure control unit as set forth in claim 1, wherein the mounting hole portion is formed with the recessed portion, by drilling.

11. The method for producing the vehicle brake hydraulic pressure control unit as set forth in claim 10, further comprising pressing the recessed portion towards the bottom surface of the mounting hole portion after the assembled part has been inserted into the mounting hole portion to form the plastically deformed portion.

12. The method for producing the vehicle brake hydraulic pressure control unit as set forth in claim 11, wherein the assembled part is sealed fluid tightly by virtue of a residual radial stress in the plastically deformed portion.

13. The method for producing the vehicle brake hydraulic pressure control unit as set forth in claim 1, wherein
the drilling forms the recessed portion at an upper portion of the mounting hole, and
the forming the plastically deformed portion on the hole wall of the mounting hole portion is provided by pressing the recessed portion towards the bottom surface of the mounting hole portion.

14. The method for producing a vehicle brake hydraulic pressure control unit as set forth in claim 13, wherein the plastically deformed portion is formed remotely from the recessed portion.

15. The method for producing the vehicle brake hydraulic pressure control unit as set forth in claim 1, wherein the plastically deformed portion on the hole wall of the mounting hole portion engages the locking groove below the cylindrical smaller diameter upper side of the locking groove.

16. The method for producing the vehicle brake hydraulic pressure control unit as set forth in claim 15, wherein the plastically deformed portion on the hole wall of the mounting hole portion engages the locking groove above the cylindrical lower side of the locking groove.

17. The method for producing the vehicle brake hydraulic pressure control unit as set forth in claim 16, wherein the plastically deformed portion on the hole wall of the mounting hole does not make contact with an innermost portion of the locking groove.

18. A method for producing a vehicle brake hydraulic pressure control unit comprising:
drilling a bottomed mounting hole portion in a base body comprising a brake fluid flow path so as to communicate with the flow path, wherein the drilling is provided by a stepped drilling tool which forms the mounting hole portion with a stepped portion and a recessed portion formed by an upper stepped portion of the drilling tool;
inserting an assembled part in the stepped portion so that a lower end surface of the assembled part is brought into abutment with a bottom surface of the mounting hole portion; and
forming a plastically deformed portion on a hole wall of the mounting hole portion in the stepped portion by pressing a bottom surface of the recessed portion towards the bottom surface of the mounting hole portion towards the bottom surface of the mounting hole portion with a clamping jig so as to bring the plastically deformed portion into engagement with a locking groove of the assembled part, wherein
an outside diameter at an upper side of the locking groove is made smaller than an outside diameter at a lower side of the locking groove,
the upper side of the locking groove is cylindrical, and
the smaller diameter at the cylindrical upper side of the locking groove is:
positioned between the locking groove and a top beveled surface,
makes contact with an inner circumferential wall of the hole wall when forming the plastically deformed portion, and
partially extends outside of the hole wall.

19. The method for producing a vehicle brake hydraulic pressure control unit as set forth in claim 18, wherein the lower side of the locking groove is cylindrical.

* * * * *